(12) United States Patent  
Gregg, III et al.

(10) Patent No.: US 8,403,256 B1
(45) Date of Patent: Mar. 26, 2013

(54) SWEPT-WING POWERED-LIFT AIRCRAFT

(75) Inventors: Robert D Gregg, III, Fullerton, CA (US); Aaron J. Kutzmann, Long Beach, CA (US); David J. Manley, Huntington Beach, CA (US); John C. Vassberg, Long Beach, CA (US); Neal Harrison, San Clemente, CA (US); Max Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 821 days.

(21) Appl. No.: 12/410,894

(22) Filed: Mar. 25, 2009

(51) Int. Cl.
*B64C 39/12* (2006.01)

(52) U.S. Cl. .......... 244/45 R; 244/207; 244/119; 244/55

(58) Field of Classification Search ................ 244/45 R, 244/207, 119, 55, 212
See application file for complete search history.

(56) References Cited

U.S. PATENT DOCUMENTS

| | | | |
|---|---|---|---|
| 1,431,520 | A | 10/1922 | Hall |
| 2,236,482 | A | 3/1941 | Zindel |
| 2,967,034 | A | 1/1961 | Eyre |
| 3,090,584 | A | 5/1963 | Kuchemann et al. |
| 3,119,333 | A | 1/1964 | Loughran |
| 3,126,171 | A | 3/1964 | Stepniewski et al. |
| 3,721,406 | A | 3/1973 | Hurlbert |
| 3,869,102 | A | 3/1975 | Carroll |
| 3,971,534 | A | 7/1976 | Grotz |
| 4,004,755 | A | 1/1977 | Hooper |
| 4,019,696 | A | 4/1977 | Hirt et al. |
| 4,106,730 | A | 8/1978 | Spitzer et al. |
| 4,198,018 | A | 4/1980 | Brault |
| 4,426,054 | A | 1/1984 | Wang |
| 4,447,028 | A | 5/1984 | Wang |
| 4,662,587 | A | 5/1987 | Whitener |
| 4,709,880 | A | 12/1987 | Bradfield et al. |
| 5,009,374 | A | 4/1991 | Manfredi et al. |
| 5,062,589 | A | 11/1991 | Roth et al. |
| 5,170,964 | A | 12/1992 | Enderle et al. |
| 5,478,016 | A | 12/1995 | Mansfield |
| 5,593,112 | A | 1/1997 | Maier et al. |
| 6,047,923 | A | 4/2000 | Lafferty |
| 6,123,295 | A | 9/2000 | Wexler et al. |
| 6,138,957 | A | 10/2000 | Nastasi et al. |
| 6,164,563 | A | 12/2000 | Bouiller et al. |
| 6,273,263 | B1 | 8/2001 | Sprenger |
| 6,394,392 | B1 | 5/2002 | Lafferty |
| 6,729,575 | B2 | 5/2004 | Bevilaqua |
| 6,857,600 | B1 | 2/2005 | Walker et al. |
| 6,923,403 | B1 | 8/2005 | Dizdarevic et al. |

(Continued)

OTHER PUBLICATIONS

U.S. Notice of Allowance dated Apr. 15, 2011 in U.S. Appl. No. 12/410,830.

(Continued)

*Primary Examiner* — Christopher P Ellis
(74) *Attorney, Agent, or Firm* — Hope Baldauff Hartman, LLC

(57) ABSTRACT

Apparatus and methods provide for a swept-wing powered-lift aircraft. Aspects of the disclosure provide a powered-lift aircraft that utilizes the engine exhaust flow over upper surface blown flaps to increase lift during various flight operations. The powered-lift aircraft has wings with inboard portions and outboard portions. The adjacent inboard and outboard portions share a swept leading edge. The leading edge is swept to a degree that shifts the outboard portion rearward to a position in which the aircraft center of lift has little to no variance upon the activation or deactivation of a powered-lift system.

10 Claims, 23 Drawing Sheets

U.S. PATENT DOCUMENTS

| | | | |
|---|---|---|---|
| 7,093,793 | B2 | 8/2006 | Lair |
| 7,093,798 | B2 | 8/2006 | Whelan et al. |
| 7,740,202 | B2 | 6/2010 | Namaizawa et al. |
| 7,753,311 | B2 | 7/2010 | Gustafsson |
| 7,793,884 | B2 | 9/2010 | Dizdarevic et al. |
| 7,823,840 | B2 | 11/2010 | Shmilovich et al. |
| 7,878,458 | B2 | 2/2011 | Shmilovich et al. |
| 7,900,868 | B2 * | 3/2011 | Sankrithi et al. ............... 244/10 |
| 2003/0218094 | A1 | 11/2003 | Lair |
| 2004/0060548 | A1 | 4/2004 | Carroll |
| 2004/0089765 | A1 | 5/2004 | Levy |
| 2007/0007388 | A1 | 1/2007 | Harrison et al. |
| 2007/0018034 | A1 | 1/2007 | Dickau |
| 2007/0295860 | A1 | 12/2007 | Gustafsson |
| 2008/0121756 | A1 | 5/2008 | McComb |
| 2008/0223992 | A1 | 9/2008 | Shmilovich et al. |
| 2008/0236138 | A1 | 10/2008 | Gustafsson |
| 2009/0313969 | A1 | 12/2009 | Lair et al. |
| 2010/0133382 | A1 | 6/2010 | Pahl |
| 2010/0155532 | A1 | 6/2010 | Ariza Martin et al. |
| 2011/0101158 | A1 | 5/2011 | Welch et al. |

OTHER PUBLICATIONS

U.S. Notice of Allowance dated Aug. 4, 2011 in U.S. Appl. No. 12/410,830.
U.S. Office Action dated Jun. 8, 2011 in U.S. Appl. No. 12/410,828.
U.S. Office Action dated Nov. 8, 2011 in U.S. Appl. No. 12/410,828.
U.S. Notice of Allowance dated Aug. 19, 2011 in U.S. Appl. No. 12/410,820.
U.S. Notice of Allowance dated Oct. 20, 2011 in U.S. Appl. No. 12/410,880.
Wikipedia, "Blended Wing Body"; http://en.wikipedia.org/wiki/Blended_wing_body accessed Jul. 13, 2011.
Wikipedia, "Boeing YC-14"; http://en.wikipedia.org/wiki/Boeing_YC-14 accessed Jul. 13, 2011.
AFTI F-111 Mission Adaptive Wing (MAW) in flight; NASA Dryden Flight Research Center Photo Collection; http://www.dfrc.nasa.gov/gallery/photo/F-111AFTI/Large/EC86-33385-002.jpg NASA Photo: EC86-33385-002, Date: Feb. 27, 1986.
The Wing is the Thing, http://www.twitt.org/bwb3.jpg accessed Jul. 13, 2011.
Goyer, Norm, "The 1940s Decade of Weird Wings"; Aircraft Market Place, Blog Archive http://acmp.com/blog/the-1940s-decade-of-weird-wings.html, Dec. 9, 2009.
U.S. Notice of Allowance dated Dec. 8, 2011 in U.S. Appl. No. 12/410,880.
U.S. Notice of Allowance dated Dec. 13, 2011 in U.S. Appl. No. 12/410,820.
U.S. Official Action dated Jan. 5, 2012 in U.S. Appl. No. 12/410,828.
U.S. Notice of Allowance dated Jun. 21, 2012 in U.S. Appl. No. 12/410,828.
U.S. Notice of Allowance dated Jun. 25, 2012 in U.S. Appl. No. 13/428,095.
U.S. Notice of Allowance dated Jul. 11, 2012 in U.S. Appl. No. 12/410,865.

* cited by examiner

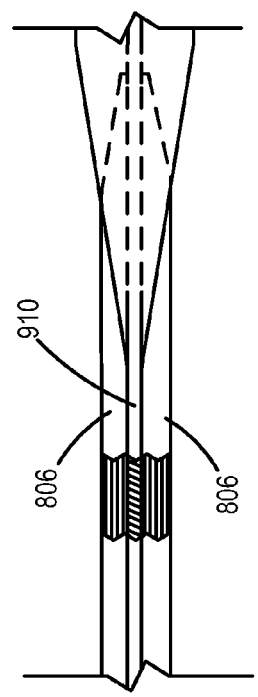
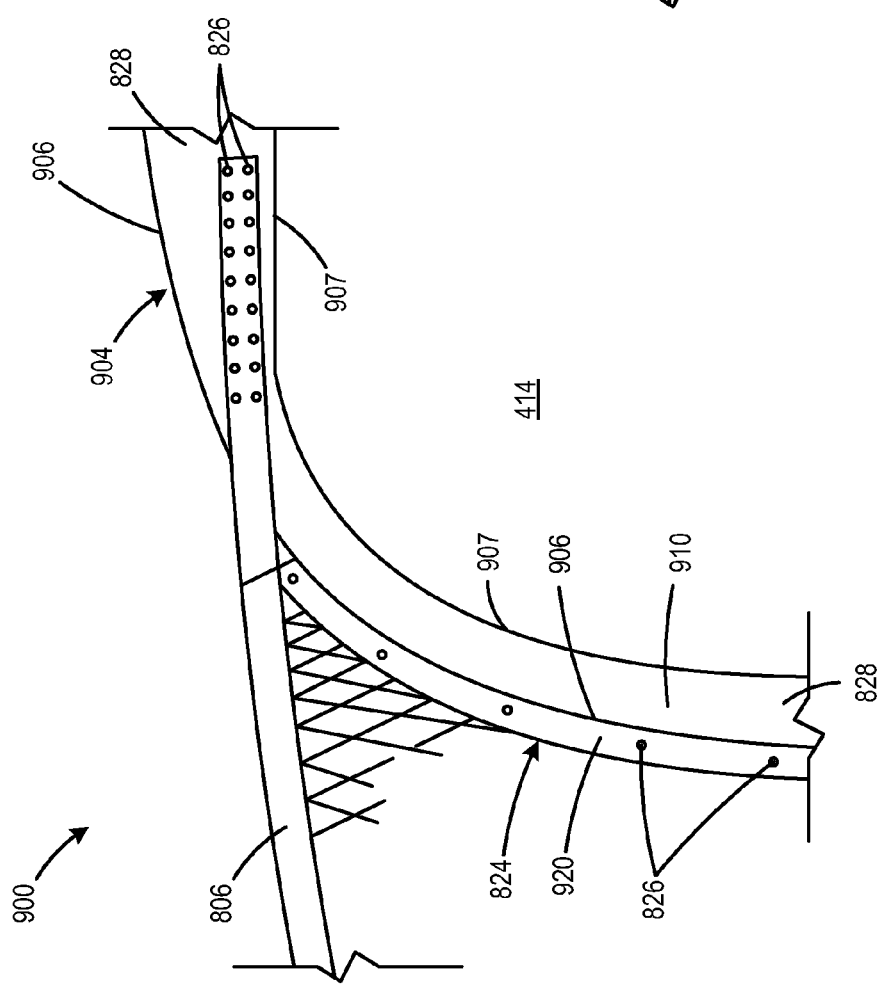
FIG. 9B
FIG. 9A

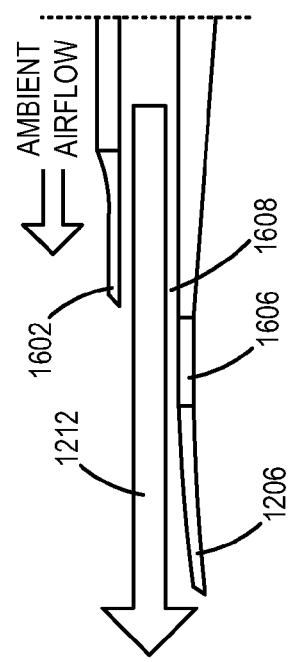
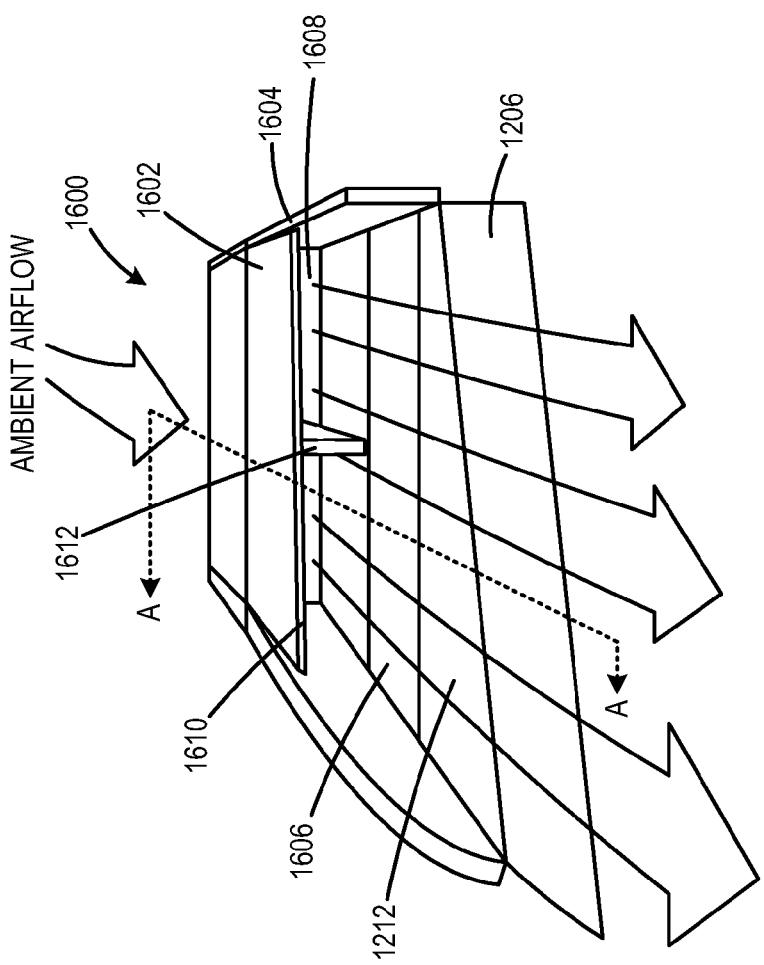
FIG. 16B
FIG. 16A

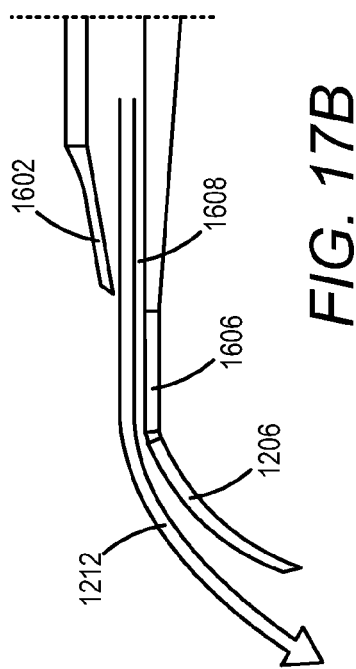
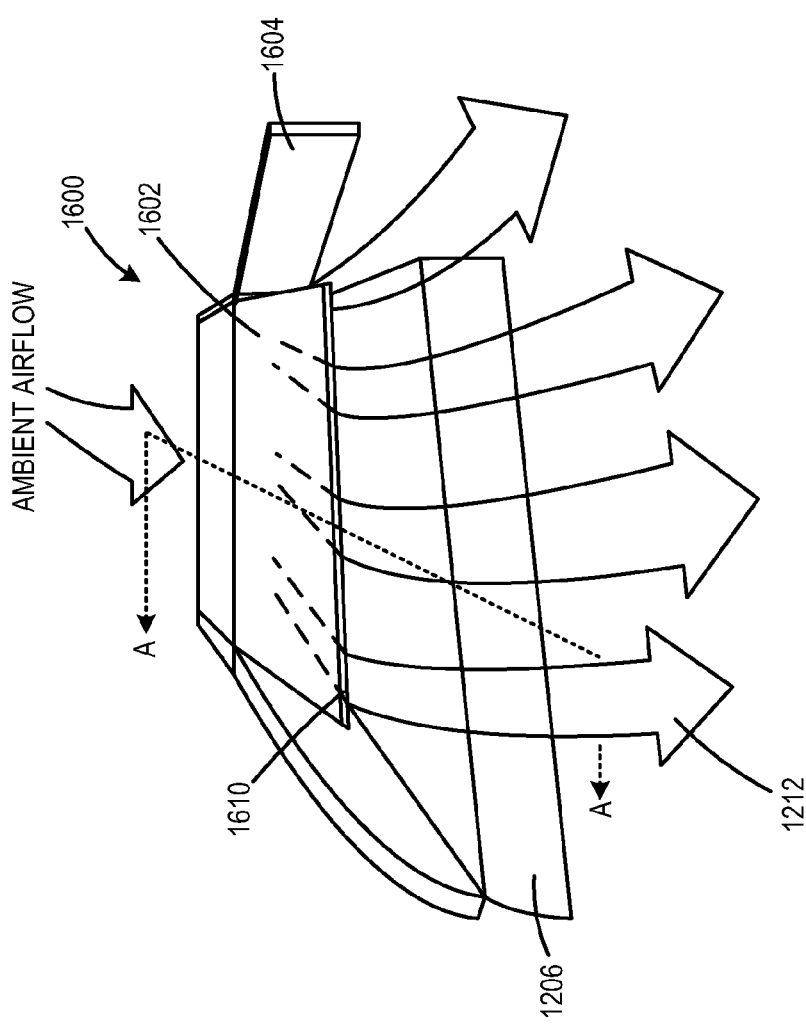

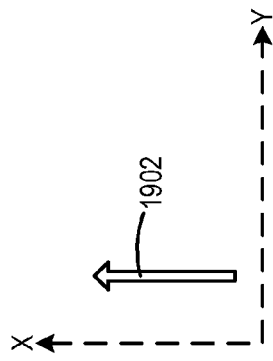
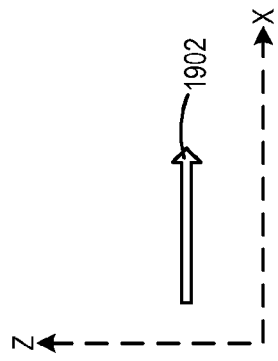
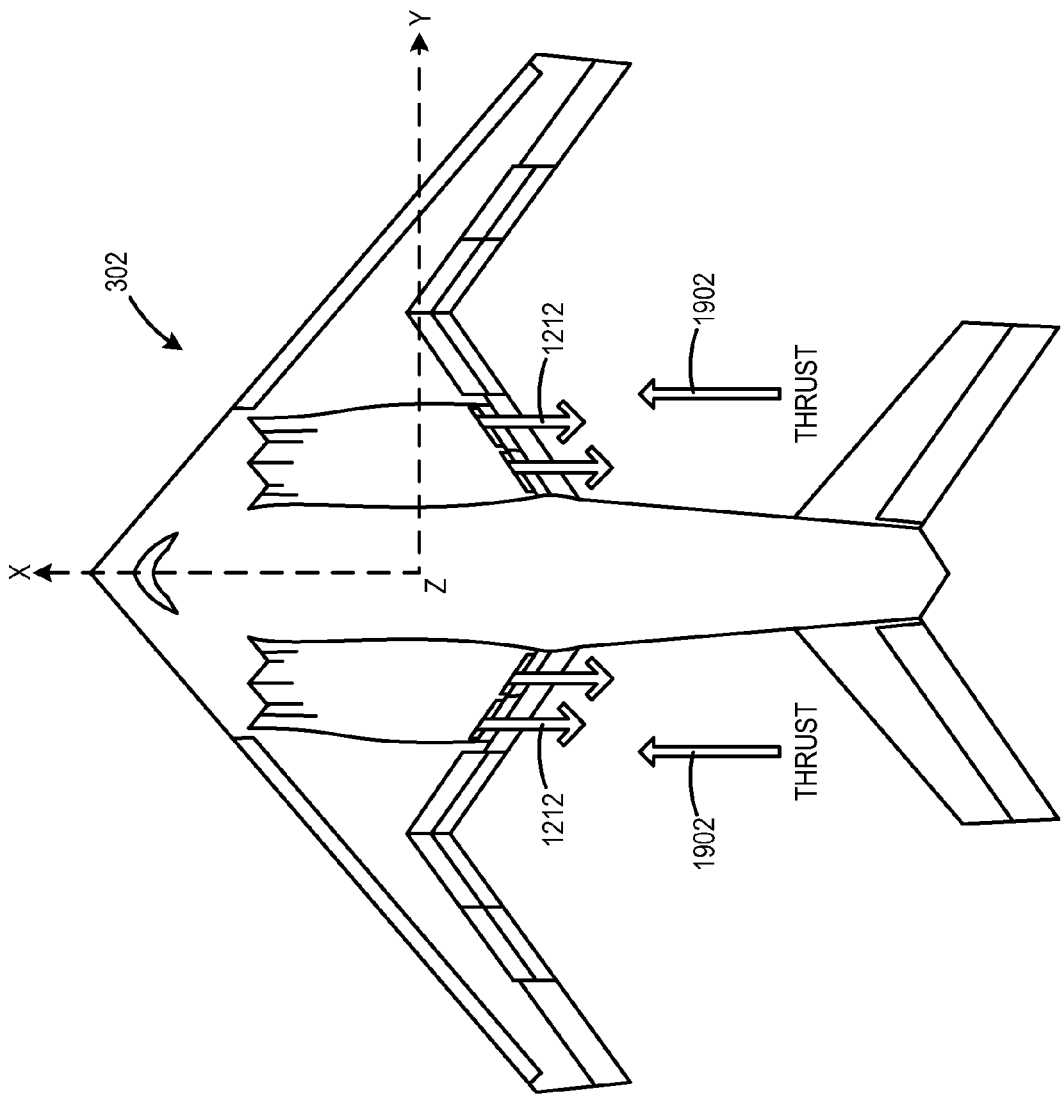

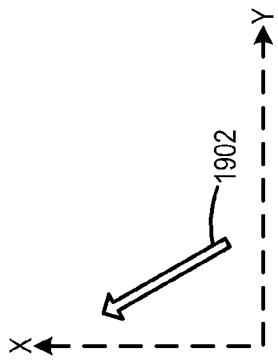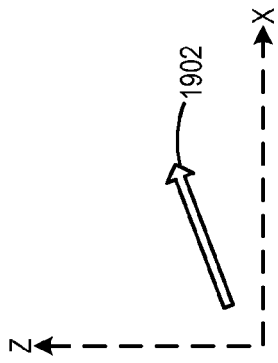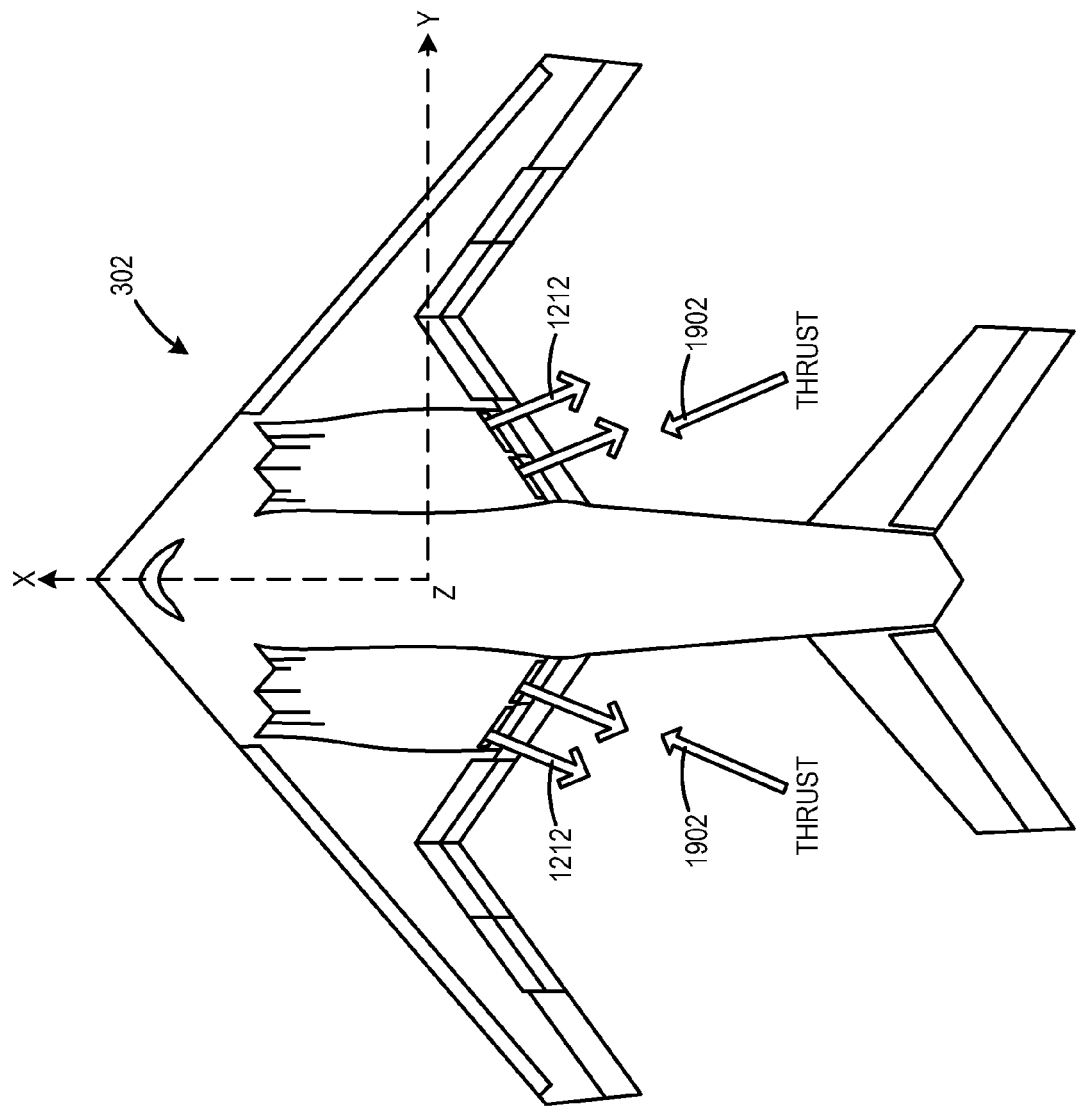

SWEPT-WING POWERED-LIFT AIRCRAFT

BACKGROUND

When designing an aircraft, wing characteristics are typically dependent upon the type of mission that the aircraft will be primarily performing. Wing thickness may be a factor of the desired lift criteria, while the angle of wing sweep may be selected according to the desired cruise speed. Conventionally, the slower the aircraft, the lower the sweep, while the faster the aircraft, the higher the sweep. For example, fighter aircraft that are designed for supersonic flight commonly take advantage of aerodynamic advantages corresponding to a highly-swept wing planform. Conversely, cargo aircraft that are designed to maximize lift at subsonic speeds commonly utilize wing planform designs that do not include a high degree of sweep.

Powered-lift aircraft include aircraft that utilize upper surface blown (USB) flap technology to significantly increase lift through the deployment of flaps within the exhaust plumes of the engines. These aircraft commonly use minimal wing sweep angles since low-speed, high-lift flight operations are a primary design focus. A characteristic inherent with conventional powered-lift aircraft is that these aircraft experience significant changes in the balance and stability of the aircraft upon activation and deactivation of powered-lift systems during low-speed operations. This stability shift is due to the increased pitching moment created when the flaps, located aft of the aircraft center of gravity, create large quantities of additional lift when deployed in the engine exhaust plumes. The pitching moment changes dramatically again when the flaps are retracted, significantly decreasing the lift. To control this shift in aircraft stability, large tail surfaces are commonly utilized to counter the induced pitching moments. However, large tail surfaces result in additional drag as well as an increase in the size of the radar signature of the aircraft.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for a swept-wing powered-lift aircraft that includes a wing with inboard and outboard portions. The inboard portion includes a rearward-swept leading edge and a wing flap that is positioned within an exhaust flow of an aircraft engine. The outboard portion of the wing shares the leading edge of the inboard portion and includes a rearward-swept trailing edge. The outboard portion of the wing is configured such that the center of lift of the aircraft is positioned approximately along a lateral axis that includes the center of lift of the wing flap.

According to another aspect, a method for providing a swept-wing powered-lift aircraft includes determining a sweep angle of a leading edge of an aircraft wing, a sweep angle of a trailing edge of an outboard portion of the aircraft wing, and a sweep angle of a trailing edge of an inboard portion of the aircraft wing. These angles are determined to position a center of lift with a powered-lift system activated at approximately a position of the center of lift with the powered-lift system deactivated to minimize or eliminate any associated pitching moment. An aircraft wing is provided with these determined sweep angles and a powered-lift system that includes an engine mounting location forward of a USB flap so that an exhaust plume from the engine flows over the top surface of the flap to create lift.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 9A is an enlarged view of a portion of FIG. 8 showing a splicing location of an upper spar chord into the aircraft fuselage according to various embodiments presented herein;

FIG. 9B is a top view of the upper portion of the aircraft fuselage of FIG. 9A showing a splicing location where the upper spar chord splices into the upper aircraft super frame according to various embodiments presented herein;

FIGS. 16A-18C are perspective and cross-sectional views of a controllable nozzle aperture in various configurations according to various embodiments presented herein;

FIG. 19A is a top view of a cargo aircraft showing thrust vector orientation with respect to flight operations using open configurations of controllable nozzle apertures according to various embodiments presented herein;

FIGS. 19B and 19C are graphical depictions of a thrust vector of FIG. 19A within an X-Y plane and a Z-X plane, respectively, of a three-dimensional coordinate system shown in FIG. 19A;

FIG. 20A is a top view of a cargo aircraft 32 showing thrust vector orientation with respect to flight operations using closed configurations of controllable nozzle apertures according to various embodiments presented herein;

FIGS. 20B and 20C are graphical depictions of a thrust vector of FIG. 20A within an X-Y plane and a Z-X plane, respectively, of a three-dimensional coordinate system shown in FIG. 20A;

DETAILED DESCRIPTION

The following detailed description is directed to an advanced cargo aircraft that incorporates various features described below to control the creation of lift, provide short take-off and landing (STOL) capabilities, decrease aircraft weight, increase aircraft survivability, and to maximize various flight performance factors. As discussed above, conventional powered-lift aircraft utilize minimally swept wings as they are designed for subsonic flight operations. The center of lift of the aircraft may change dramatically as the flaps are deployed and retracted due to the substantial change in the amount of lift created with and without flap deployment. This substantial movement in the center of lift creates undesirable pitching moments that necessitate large tail surfaces to control these pitching moments.

Utilizing the concepts and technologies described herein, a cargo or passenger aircraft utilizes a highly swept powered-lift aircraft wing to shift the center of lift rearward to a position that is approximately aligned with the center of lift of the flaps so that the aircraft center of lift does not substantially change with the activation or deactivation of a powered-lift system.

Figure 1:
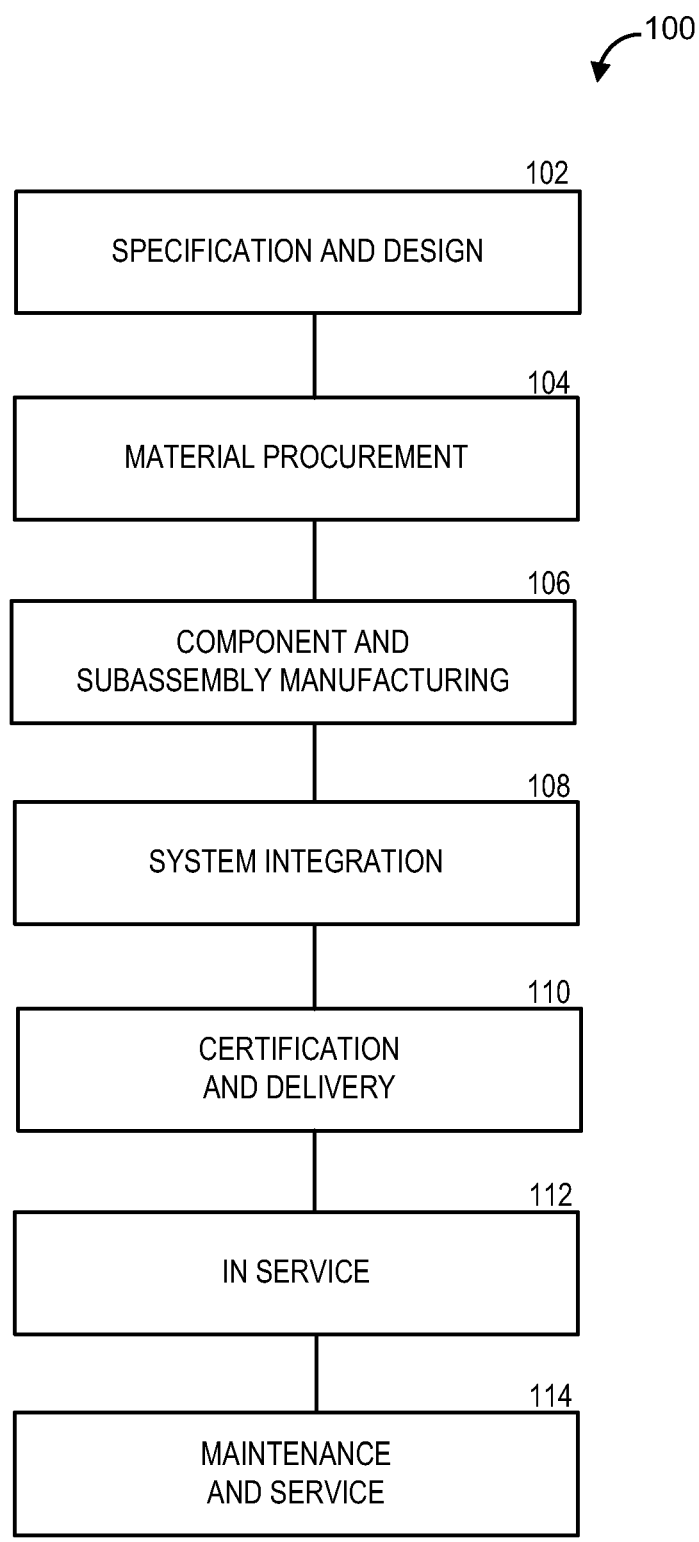
FIG. 1 is a flow diagram of aircraft production and service methodology.
Figure 2:
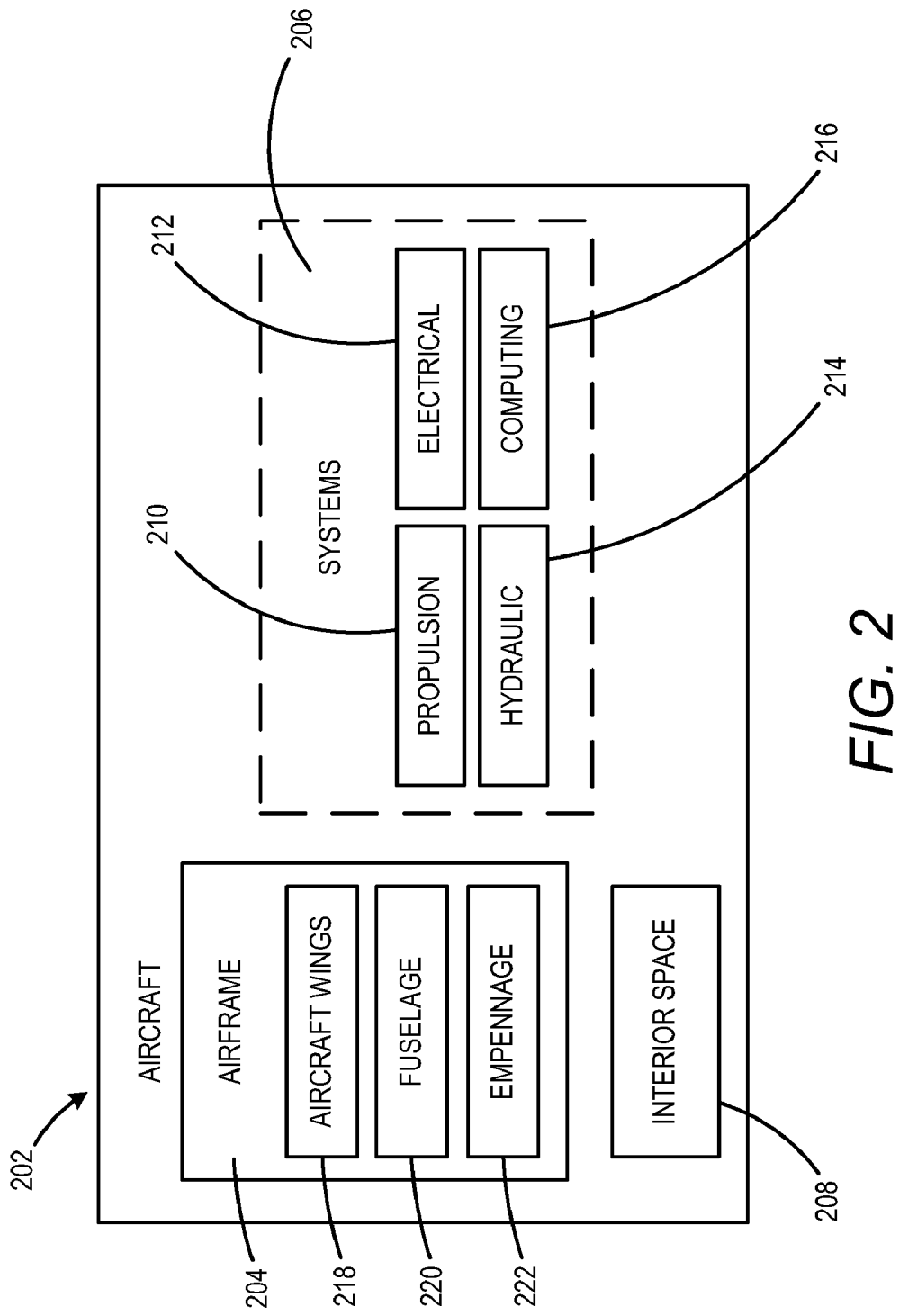
FIG. 2 is a block diagram of an aircraft according to various embodiments presented herein.

In the following detailed description, references are made to the accompanying drawings that form a part hereof, and which are shown by way of illustration, specific embodiments, or examples. Referring now to the drawings, in which like numerals represent like elements through the several figures, a swept-wing powered-lift aircraft according to the various embodiments will be described. Embodiments of the disclosure may be described in the context of an aircraft manufacturing and service routine 100 as shown in FIG. 1 and an aircraft 202 as shown in FIG. 2. During pre-production, exemplary routine 100 may include specification and design 102 of the aircraft 202 and material procurement 104. During production, component and subassembly manufacturing 106 and system integration 108 of the aircraft 202 takes place. Thereafter, the aircraft 202 may go through certification and delivery 110 in order to be placed in service 112. While in service by a customer, the aircraft 202 is scheduled for routine maintenance and service 114 (which may also include modification, reconfiguration, refurbishment, and so on).

Each of the operations of routine 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and others.

FIG. 2 shows a simplified diagram of an aircraft 202 according to the embodiments described herein. The aircraft 202 may include an airframe 204, a plurality of systems 206, and an interior space 208. The airframe 204 includes aircraft wings 218, a fuselage 220, and an empennage 222. For the purposes of this disclosure, the empennage 222 may include the tail section of the aircraft 202 and any portions of the fuselage 220 to which it attaches. Examples of high-level systems 206 include, but are not limited to, a propulsion system 210, an electrical system 212, a hydraulic system 214, and a computing system 216. The computing system 216 may be functional to control any of the other aircraft systems 206 in the manners described below.

Figure 3:
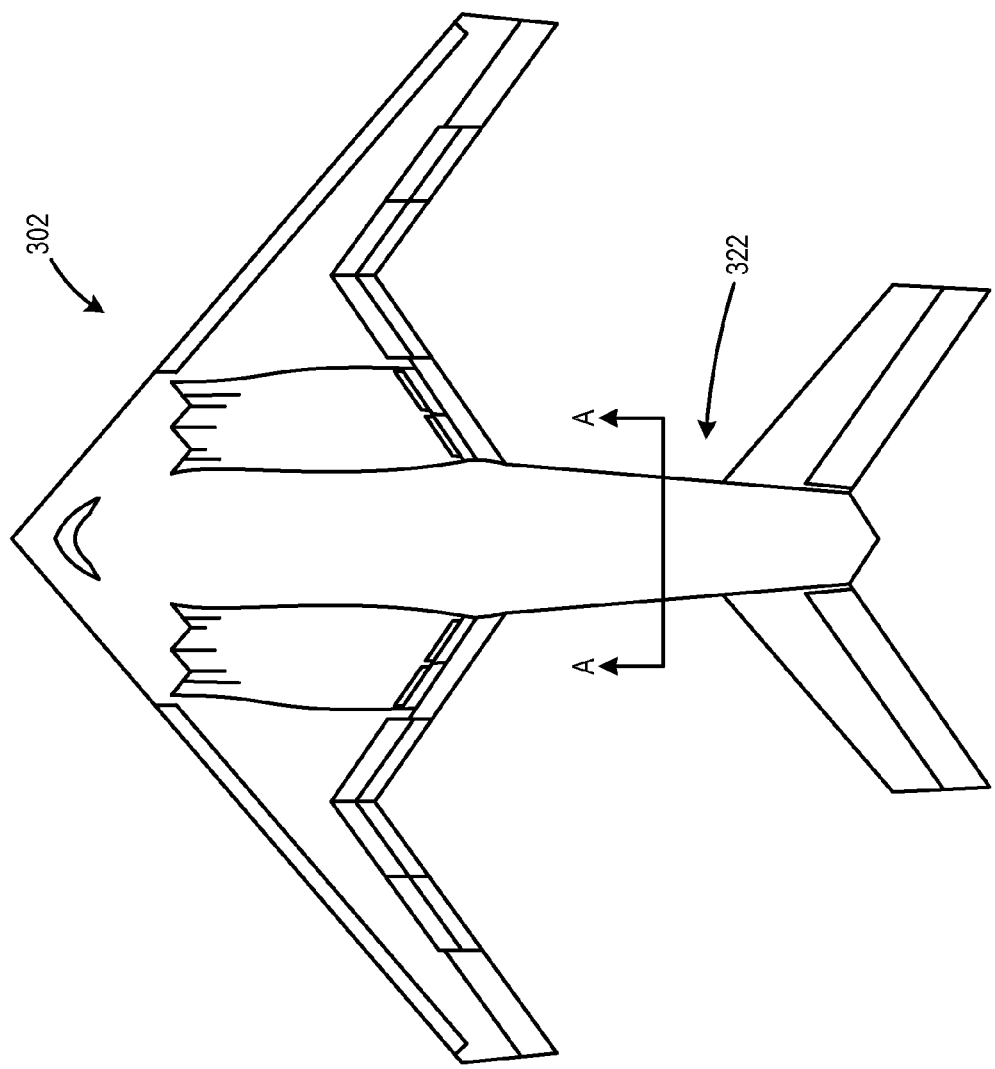
FIG. 3 is a top view of a cargo aircraft showing a twin-boom empennage according to various embodiments presented herein.
Figure 4:
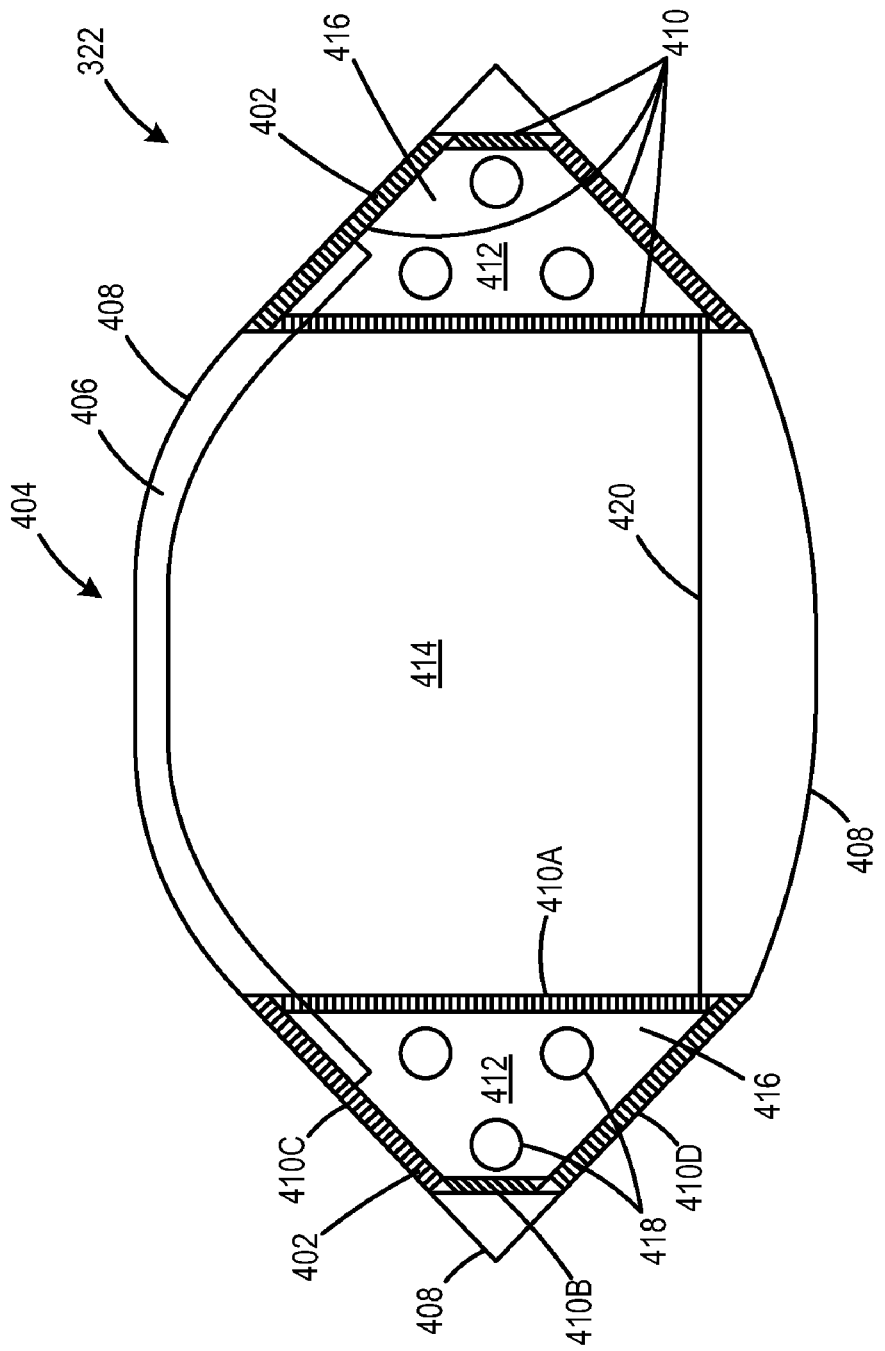
FIG. 4 is a cross-sectional view of the twin-boom empennage along line A-A as shown in FIG. 3 according to various embodiments presented herein.

FIG. 3 shows a cargo aircraft 302 according to various embodiments described herein. It should be appreciated that the cargo aircraft 302 shown in FIG. 3 is just one embodiment of an aircraft 202 utilizing aspects of this disclosure. The various concepts described herein are not limited to the particular design, configuration, components, features, and combination thereof shown in FIG. 3 and described within the illustrative examples given below. For example, while the twin-boom empennage 322 feature of the cargo aircraft 302 described below with respect to FIG. 4 is not limited to the aircraft planform shown in FIG. 3 and is not limited to an aircraft 202 configured to transport cargo. Rather, the weight savings and structural rigidity provided by the twin-boom empennage concept described herein may benefit any aircraft 202 of any design and purpose in which access cut-outs within the aircraft empennage 222 are desirable.

Turning now to FIG. 4, a cross-sectional view of the twin-boom empennage 322 along line A-A as shown in FIG. 3 will be described. The twin-boom empennage 322 includes two torque tube members 402 and a bridging member 404. The torque tube members 402 are positioned on opposite sides of the twin-boom empennage 322 and independently act as torque boxes to provide very strong lateral supports for the empennage. Connecting the torque tube members 402 with the bridging member 404 creates a rigidity that allows the twin-boom empennage 322 to satisfy stringent flutter and load bearing criteria.

According to various embodiments, the bridging member 404 may include one or more frame members 406 that extend between the torque tube members 402. The frame members 406 penetrate and are spliced into the top portions of each of the torque tube members 402 as shown in FIG. 4. Additionally, the bridging member 404 may additionally include aircraft skin 408 or a combination of frame members 406 and aircraft skin 408. According to one embodiment, the bridging member 404 includes a number of parallel frame members 406 that are spaced apart along the length of the twin-boom empennage 322, spliced into the top portions of the torque tube members 402, and are covered with and attached to the aircraft skin 408.

Each torque tube member 402 includes at least one wall 410 that encloses a space 412 extending the length of the torque tube member 402. According to the embodiment shown in FIG. 4, the cargo aircraft 302 utilizes two torque tube members 402, each having four walls, 410A-410D configured into a trapezoidal cross-sectional shape. However, it should be appreciated that the torque tube members 402 may include any number of walls 410 that are configured into any cross-sectional shape. For example, an alternative embodiment may include torque tube members 402 that have a single wall configured into a circular cross-sectional shape such that each torque tube member 402 is a cylindrical tube extending from the fuselage 220 of the aircraft 202. According to yet another embodiment, the inner wall 410A is vertical while the outer walls 410B-410D form a single semi-circular wall so that the torque tube members 402 have a "D" shaped cross-section.

The specific configuration of the torque tube members 402 may depend on the desired external shape and other features of the twin-boom empennage 322. The trapezoidal shape of the torque tube members 402 shown in FIG. 4 provides inner walls 410A to act as internal lateral barriers to a payload space 414. The outer walls 410C and 410D act as external barriers of the cargo aircraft 302 to which the aircraft skin 408 is attached. Additional structural components (not shown) may be included to support the aircraft skin 408 in the desired shape. In the embodiment shown, the aircraft skin 408 comes together at points on opposite sides of the cargo aircraft 302, while outer walls 410B provide vertical surfaces behind the aircraft skin 408 to which aircraft components may be mounted.

It should be appreciated that the desired torsional rigidity and bending rigidity characteristics of the torque tube members 402 may be achieved by modifying the cross-sectional area and shape of the torque tube members 402, as well as by utilizing torque tube member materials and aircraft skin materials having desirable characteristics, such as desirable gage and material modulus characteristics. According to one embodiment, high modulus fibers are utilized in the aircraft skin 408 of the twin-boom empennage 322, which may reduce the weight of the aircraft by as much as 40% as compared to conventional aircraft skin 408 materials that do not utilize high modulus fibers, while retaining the desired torsional stiffness needed to suppress undesirable flutter associated with the empennage.

As can be seen in FIG. 4, the two torque tube members 402, the bridging member 404, and the aircraft floor 420 create lateral, upper, and lower barriers, respectively, around the payload space 414 that traverses the center of the twin-boom empennage 322. Due to the rigidity provided by the torque tube members 402 and bridging member 404, an access cut-out can be made in the aircraft skin 408 for access to the payload space 414 without compromising the load bearing capabilities of the twin-boom empennage 322 and without requiring additional structural framework to be provided around the access cut-out. Rather, the pre-existing torque tube members 402 and bridging member 404 provide the structural support of the access cut-out that would traditionally have needed to be incorporated around access cut-outs in conventional aircraft designs.

According to one embodiment, the torque tube members 402 may further include one or more stiffening members 416 intersecting the space 412 within the interior of the torque tube members 402 at any number of locations along their lengths. These stiffening members 416 serve in a similar manner as ribs within an aircraft wing to further strengthen the twin-boom empennage 322. To minimize the weight, any number, size, and configuration of apertures 418 may be included within the stiffening members 416, or within any of the walls 410 of the torque tube members 402.

As discussed above, the twin-boom empennage 322 encompasses a payload space 414 that may be used to transport cargo and/or personnel. Various implementations of the cargo aircraft 302 provide for the pressurization of the payload space 414. Consequently, it should be appreciated that one or more walls 410 of the torque tube members 402, as well as the bridging member 404 and the aircraft floor 420, may provide a pressure barrier that maintains a desired pressure within the payload space 414. According to one embodiment, the inner walls 410A provide the pressure barriers such that the payload space 414 may be maintained at one pressure, while the space 412 within the interior of the torque tube members 402 may be subjected to ambient air pressure or another desired air pressure. For the purposes of this disclosure, the aircraft floor 420, the walls 410 of the torque tube members 402, and/or the bridging member 404 may include a skin or other structure that aids in pressurization of the payload space 414 encompassed by these structures.

Alternatively, the inner walls 410A of the torque tube members 402 may allow for air to flow between the payload space 414 and the space 412 within the interior of the torque tube members 402 while the outer walls 410B-410D provide a pressure barrier. In this embodiment, the payload space 414 and the space 412 within the interior of the torque tube members 402 may be pressurized to the same air pressure.

Figure 5:
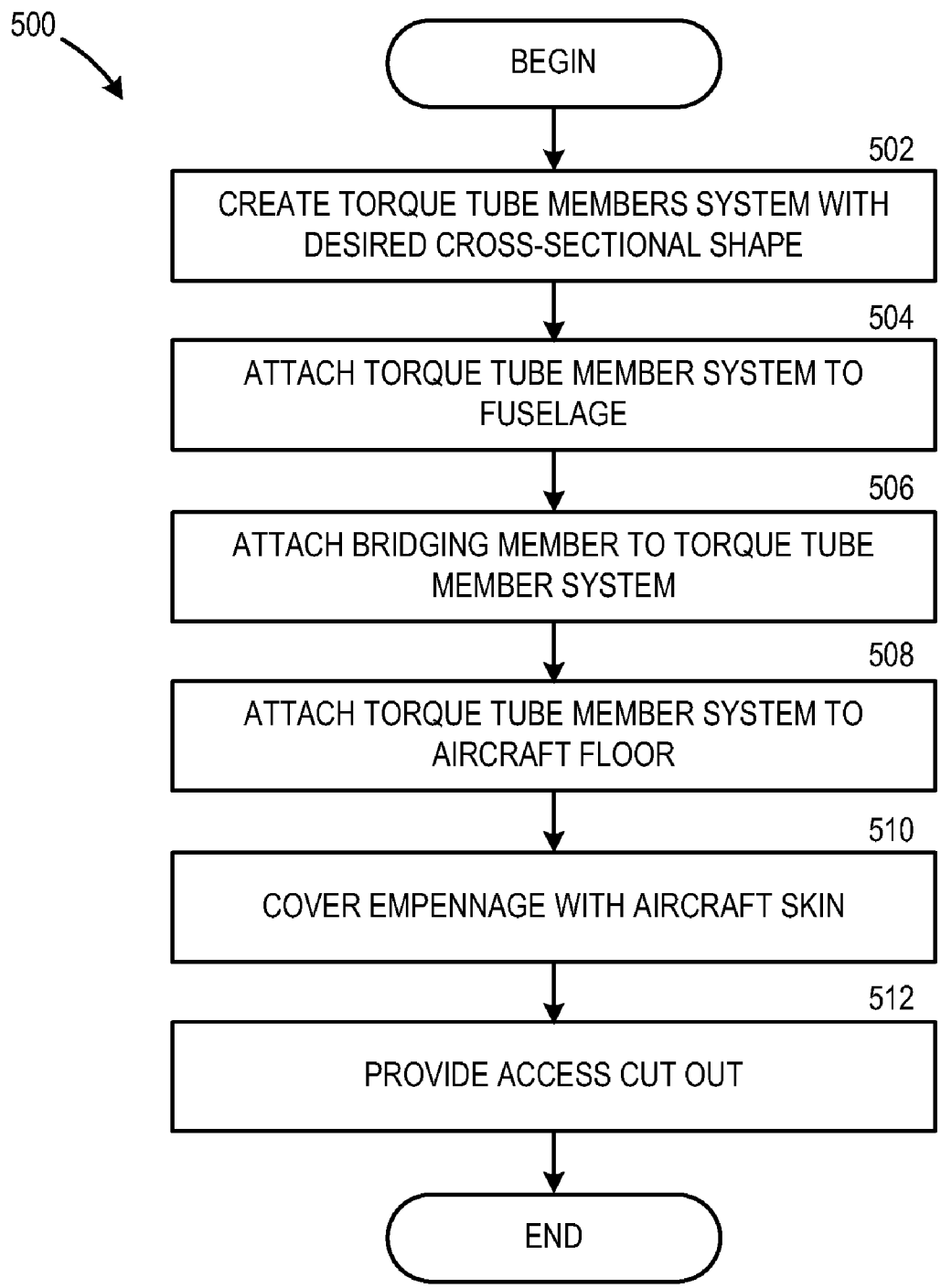
FIG. 5 is a flow diagram showing a method of providing a twin-boom empennage according to various embodiments presented herein.

Turning now to FIG. 5, an illustrative routine 500 for providing an aircraft empennage will now be described in detail. The routine 500 outlines a process for manufacturing the twin-boom empennage 322 described above. It should be appreciated that more or fewer operations may be performed than shown in the figures and described herein. These operations may also be performed in a different order than those described herein.

The routine 500 begins at operation 502, where two torque tube members 402 are created, each having a desired cross-sectional shape. According to one implementation, the cross-ssectional shape is trapezoidal with the longest side of the trapezoidal shape being positioned adjacent to the payload space 414, such as wall 410A, and the opposing shortest side of the trapezoidal shape positioned adjacent to a side of the cargo aircraft 302, such as wall 410B. At operation 504, the torque tube members 402 are each attached at opposing sides of a main fuselage portion of the cargo aircraft 302 such that they extend rearward away from the main fuselage portion to create opposing empennage sides. According to one embodiment, the two torque tube members 402 are parallel with one another; however, it is contemplated that the torque tube members 402 may diverge or converge as they extend away from the main fuselage portion such that the twin-boom empennage 322 widens or narrows from the fuselage to the tail of the cargo aircraft 302.

From operation 504, the routine 500 continues to operation 506, where a bridging member 404 is attached to top portions of each of the two torque tube members 402. According to one implementation described above, attaching the bridging member 404 to the torque tube members 402 includes splicing opposing ends of frame members 406 into the top portions of the two torque tube members 402. The routine 500 continues from operation 506 to operation 508, where the bottom portions of the torque tube members 402 are attached to the aircraft floor 420 so that the inner walls 410A of the torque tube members 402, the bridging member 404, and the aircraft floor 420 define a perimeter of the payload space 414.

At operation 510, the outer surface of the twin-boom empennage 322 created from the torque tube members 402, the bridging member 404, and the aircraft floor 420 is covered with an aircraft skin 408. From operation 510, the routine 500 continues to operation 512, where an access cut-out is provided in the aircraft skin 408 between the two torque tube members 402 to provide access to the payload space 414 and the routine 500 ends.

As described above, various implementations of the twin-boom empennage 322 provide for different walls 410 of the torque tube members 402 to act as pressure barriers for pressurizing the payload space 414. Additionally or alternatively, the cargo aircraft 302 may utilize a more conventional pressure vessel nested within, or partially within an outer mold line fairing. Conventionally, an aircraft's payload space 414 is a pressure vessel that allows the air pressure within the payload space 414 to be pressurized in order to protect the cargo and/or personnel being transported within from the lower ambient air pressure surrounding the aircraft 202 at higher altitudes during flight. These pressure vessels are traditionally substantially cylindrical in shape so that they have a substantially circular cross-section. A reason for shaping a pressure vessel as a cylinder is to minimize the required thickness of the pressure vessel, and therefore the weight of the pressure vessel.

The pressure vessel bears an internal stress, or hoop stress, from the internal pressure of the air within. The hoop stress associated with a cylinder can be calculated as $s=(p*r)/t$, where s is the hoop stress, p represents the internal pressure, r represents the radius of the pressure vessel, and t represents the pressure vessel skin thickness. It can be seen from this equation that the hoop stress increases linearly with the radius of the pressure vessel. While this equation is not applicable to a flat panel, it can be seen that to keep the stress at or below a given value, the thickness of the pressure vessel, and consequently the weight of the pressure vessel, increases with the radius. Consequently, it may be beneficial to configure the pressurized portion of an aircraft 202 as a cylindrical pressure vessel to minimize the weight required to sustain the pressures within the aircraft 202.

For these reasons, traditional aircraft employ substantially cylindrical fuselages to take advantage of the weight savings when compared to pressurizing a vessel having a non-circular cross-section. An aircraft's outer mold line (OML) is the part of the aircraft 202 in contact with the gaseous atmosphere of the surrounding environment. Typically, the aircraft skin 408 is applied to the exterior of the pressure vessel, leading to an aircraft 202 having a fuselage 220 with a substantially cylindrical appearance when viewed from the exterior. However, aerodynamic or radar cross-section requirements may lead to a non-circular fuselage OML on a pressurized portion of an aircraft 202. These aircraft 202 having a non-circular fuselage OML have traditionally been subjected to weight penalties in pressurizing portions of the fuselage 220 that have the non-circular cross-section.

Figure 6:
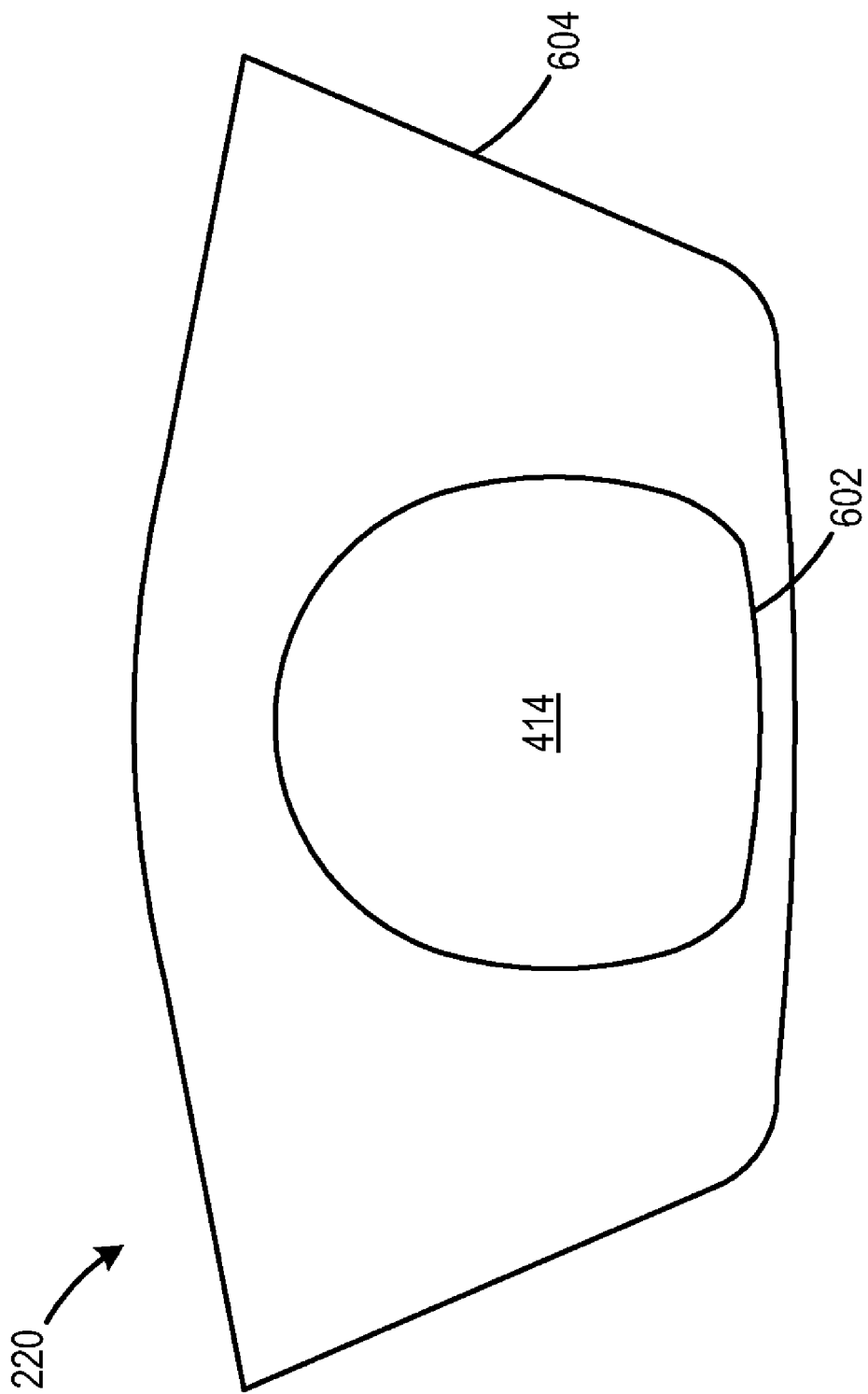
FIG. 6 is a cross-sectional view of an aircraft fuselage showing a nested pressure vessel according to various embodiments presented herein.

Utilizing the concepts described herein, various embodiments provide an aircraft 202 having a substantially cylindrical pressure vessel nested within an arbitrarily shaped OML fairing. Looking at FIG. 6, a cross-sectional view of a fuselage 220 of an aircraft 202 according to one embodiment is shown. The fuselage 220 includes a pressure vessel 602 nested within an OML fairing 604. As seen, the pressure vessel 602 has a substantially circular cross-section, allowing the thickness of the walls of the pressure vessel 602 to be minimized in order to minimize overall aircraft weight. The OML fairing 604 is shaped according to a desired exterior aircraft shape and is not limited to that shown in FIG. 6. Because the OML fairing 604 is not a pressure vessel and does not bear any of the hoop stresses associated with the pressurized payload space 414, the thickness of the OML fairing material may be minimized. It should be appreciated that the OML fairing 604 may be vented or pressure fused to preclude failure in the event of a pressure leak within the pressure vessel 602.

Figure 7:
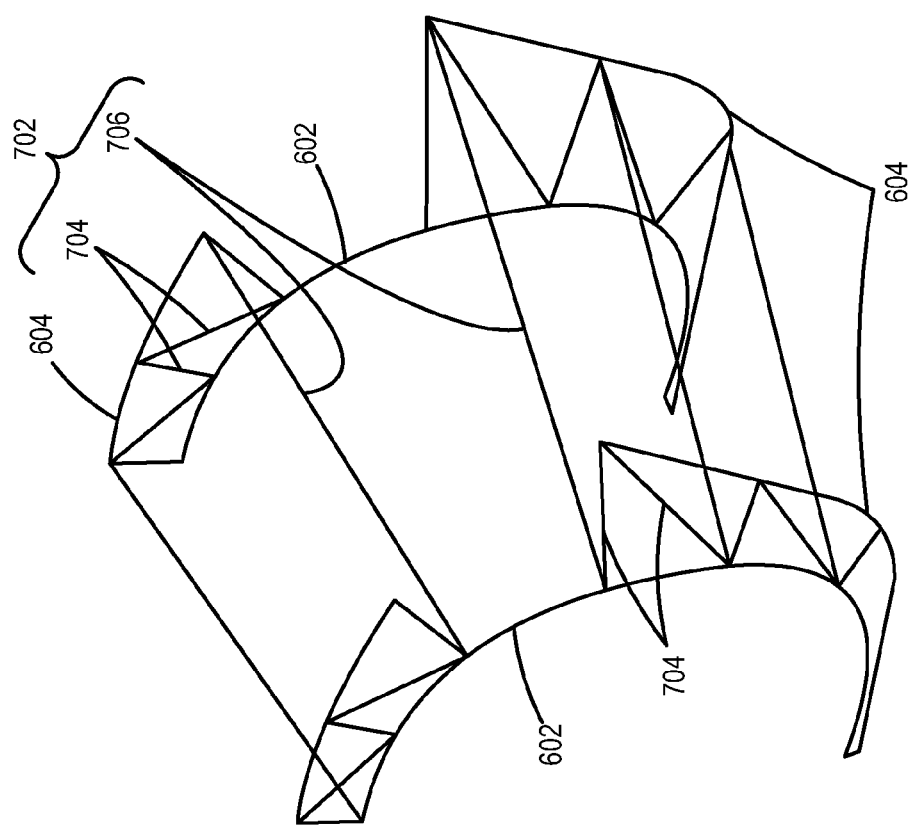
FIG. 7 is a perspective view of a portion of an aircraft substructure supporting an outer mold line fairing around a pressure vessel according to various embodiments presented herein.

Turning to FIG. 7, the substructure 702 used to support the OML fairing 604 and to transfer various loads to the pressure vessel 602 will be described. The substructure 702 is shown to be a truss system that includes a number of cross members 704 and drag links 706. Nested body frames (not shown) are used to connect the cross members 704 and drag links 706 to the pressure vessel 602. The cross members 704 transmit radial and tangential air loads to the nested pressure vessel 602 via the nested body frames. The drag links 706 transmit fore and aft loads to the nested body frames. Joints between the substructure 702 and the nested body frames allow for a predetermined amount of fore and aft motion between the pressure vessel 602 and the OML fairing 604 to preclude having the OML panel sizing determined by the buckling loads induced by the deflections of the nested pressure vessel 602 during flight.

As discussed above, nesting a substantially cylindrical pressure vessel 602 within an OML fairing 604 of any shape rather than creating a pressure vessel that is shaped according to the desired external fuselage shape allows for thinner walls to the pressure vessel 602 and reduces weight. Additionally, doing so decreases the amount of internal wetted space, or pressurized space, as compared to the wetted space should the entire fuselage cross-section be pressurized. The reduced quantity of wetted space has additional benefits. First, because the external surface of the nested pressure vessel 602, the substructure 702 and the internal surface of the OML fairing 604, is not wetted, flush rivets are not necessary within this area. Because the thickness of various aircraft panels are often set according to fastener hole knife edge conditions that are not present with rivets that are not flush, weight can be saved with thinner panels and cost minimized due to the less expensive materials and simplified installation and maintenance costs.

The substructure 702 and other framework that may be attached to the external surface of the nested pressure vessel 602 allows for easy attachment of other aircraft components and facilitates modular construction. Moreover, because the wetted space within the nested pressure vessel 602 is smaller than the wetted space within the entire fuselage cross-section should the entire fuselage 220 be pressurized, the vehicle subsystems that act upon the wetted space, such as air conditioning/pressurization systems and interior lighting systems, have less wetted space to act upon. This smaller volume of space results in smaller subsystems and power requirements for those subsystems, resulting in further weight and cost savings.

Figure 8:
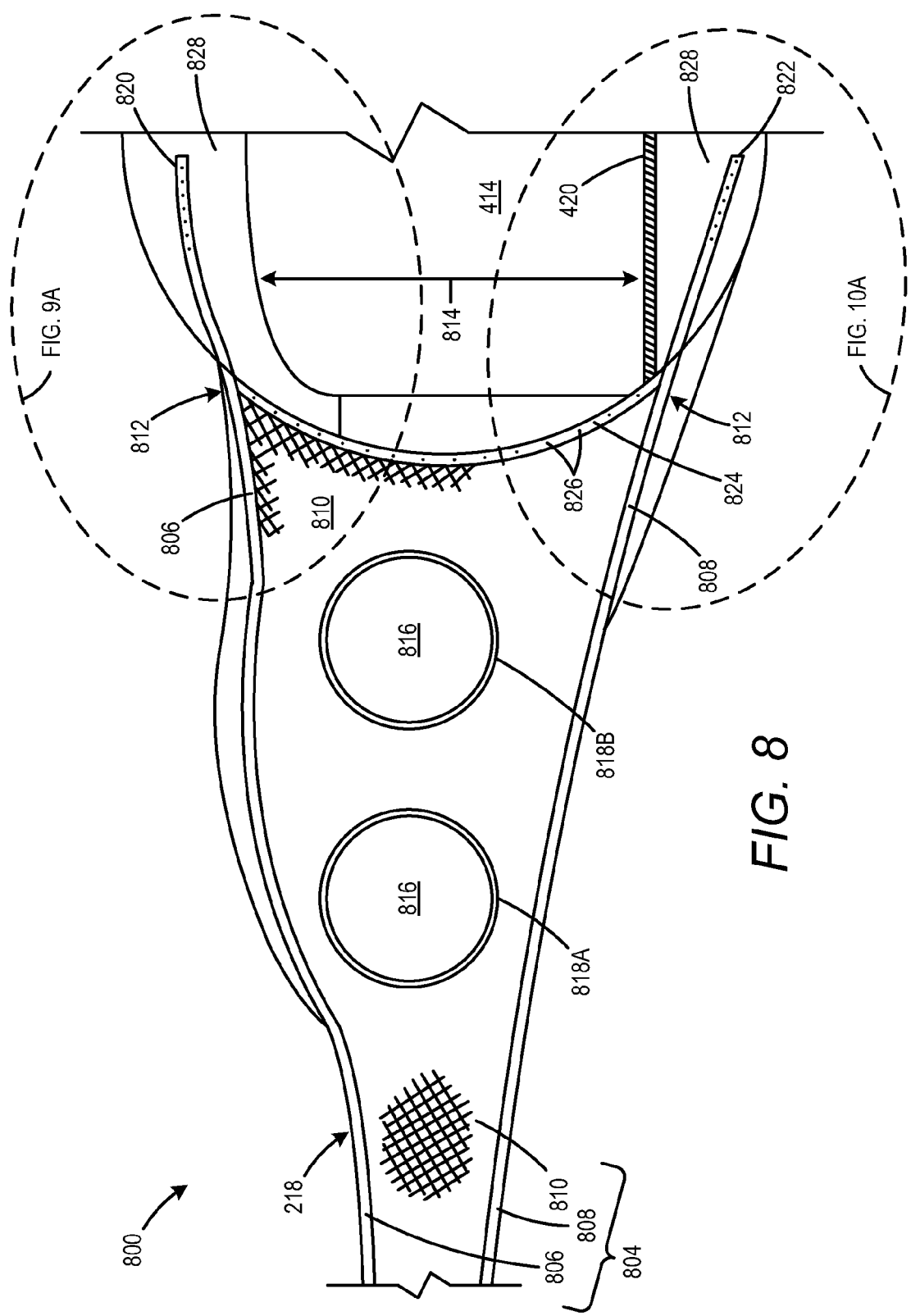
FIG. 8 is a cross-sectional view of a portion of a blended wing aircraft fuselage and wing according to various embodiments presented herein.

Turning now to FIG. 8, a blended wing aircraft configuration 800 for the cargo aircraft 302 will be described in detail. Most conventional airliners and airlifters are configured as low-wing or high-wing aircraft, while mid-wing aircraft are traditionally fighter aircraft and high speed/performance type of aircraft. For heavy lifting aircraft such as airliners and cargo aircraft, the structural wing box that supports the wing and the entire weight of the aircraft and corresponding payload is an important component that traditionally traverses above or below the payload space 414. A structural wing box for creating a mid-wing cargo aircraft would typically necessitate a very heavy structure that wraps around the payload space to support the wings at a mid-point of the fuselage. Due to this inefficiency, heavy aircraft commonly utilize low-wing or high-wing configurations.

However, utilizing the concepts described herein, performance and survivability advantages to using a mid-wing, or blended wing, configuration may be realized with a heavy lifting aircraft, such as the cargo aircraft 302. Looking at FIG. 8, a cross-sectional view of a wing and fuselage portion of the cargo aircraft 302 is shown. According to this embodiment, a wing 218 is shown to be connected to a fuselage 220 of a cargo aircraft 302 in a blended wing configuration in which the wing 218 is blended or spliced into an aircraft super frame. It should be appreciated that the opposite side of the cargo aircraft 302 is a mirror image of the blended wing aircraft configuration 800 shown in FIG. 8.

Rather than use a heavy structural wing box to connect the aircraft wings 218 to the fuselage 220, the blended wing aircraft configuration 800 includes splicing a wing spar 804 of each independent half of the wing 218 directly into an aircraft super frame of the fuselage 220 so that the fuselage 220 acts as a traditional structural wing box. It should be appreciated that with this blended wing aircraft configuration 800, the two wing halves may not be directly connected to one another, but are each connected to the fuselage 220 in a manner that allows flight loads to be transferred in part through the aircraft super frame 828 of the fuselage 220. The wing 218 includes a wing spar 804 that traverses substantially from the fuselage 220 to the wing tip. Although only a single wing spar 804 is shown, it should be understood that any number of wing spars 804 may be utilized within the aircraft wing 218. The wing spar 804 includes an upper spar chord 806, a lower spar chord 808, and a wing spar web 810 that connects the upper spar chord 806 and lower spar chord 808. For the purposes of this disclosure, the terms "spar chord" and "spar cap" are used interchangeably.

Traditionally, an aircraft wing includes multiple spars. The spars carry a large portion of the shear loads while the aircraft skin 408 that covers the wing carries a majority of the bending moment of the wing. Traditional aircraft wings are relatively thin as compared to the height of the corresponding fuselage 220 and uniformly taper from the wing root to the wing tip. However, as seen in FIG. 8, the blended wing aircraft configuration 800 includes a wing 218 that has a wing root thickness that is substantially similar to the payload space height 814. Consequently, the wing spar thickness 812 at the wing root is substantially equivalent to the payload space height 814. The wing spar 804 then tapers non-uniformly from the wing root to the wing tip.

Additionally, the wing 218 includes many cut-outs in the aircraft skin 408 to accommodate various aircraft features. Due to these cut-outs, the aircraft skin 408 may not be able to support the bending moment loads traditionally carried by the skin. An example of a wing cut-out includes, but is not limited to, aircraft component apertures 816, which extend through the wing spar web 810. In this embodiment, there are two aircraft component apertures 816 corresponding to engine mounting apertures 818A and 818B that accommodate two aircraft engines mounted within each wing 218. It should be appreciated that the blended wing aircraft configuration 800 is not limited to internally mounted engines or to any specific number of aircraft engines. Access to the aircraft engines that are mounted within the aircraft component apertures 816 is provided via cut-outs on the bottom or top of the wing 218. Further examples of wing cut-outs include engine inlets and engine nozzle apertures, as well as landing gear cut-outs.

By having a blended wing aircraft configuration 800 that includes a wing spar thickness 812 (corresponding to the height of the wing spar 804 with respect to the fuselage 220 at the wing root) that is substantially thicker than a typical aircraft wing, the actual loads on the wing spar 804 are much lower than they would be with a typical aircraft wing that was not as thick. For this reason, the wing spar 804 and corresponding aircraft super frame components can be relatively thin (i.e., the thickness of the wing spar web 810 as measured in FIG. 8 through the page) as compared to a conventional aircraft, which translates into a weight savings. Moreover, due to the thickness of the aircraft wing 218, which may be enabled by a wing 218 having a long root chord length, and the resulting smaller loads experienced by the wing structure, shear stresses can be carried by the wing spar web 810 and transferred into the fuselage 220 while the bending moment loads may be carried by the upper spar chord 806 and the lower spar chord 808, allowing for a number of wing cut-outs as described above without reliance on the aircraft skin 408 for bearing loads.

As seen in FIG. 8, an inboard end 820 of the upper spar chord 806 penetrates an upper portion of the fuselage 220 and is spliced to the aircraft super frame 828. Similarly, an inboard end 822 of the lower spar chord 808 penetrates a lower portion of the fuselage 220 and is spliced to the aircraft super frame 828. Details of the locations of attachment of the upper spar chord 806 and lower spar chord 808 to the aircraft super frame 828 will be shown in enlarged views of the areas indicated by dotted lines in FIGS. 9A and 10A, respectively, and described below. The wing spar web 810 is attached to the aircraft skin 408 around a portion of the fuselage 220 to which the wing spar web 810 abuts. Alternatively, the wing spar web 810 may attach to a nested pressure vessel 602 as described above, or to the corresponding substructure 702 or OML fairing 604.

According to one embodiment, the wing spar web 810 is connected to the fuselage 220 using fasteners and a circumferential clip 824. The circumferential clip 824 includes a contact surface shaped for intimate contact with an outside surface of the fuselage 220 and a flange projecting outward approximately 90 degrees from the contact surface. Fasteners 826 are used to secure the contact surface of the circumferential clip 824 to the fuselage 220 and to secure the wing spar web 810 to the flange of the circumferential clip 824. Alternatively, embodiments in which the fuselage 220 is manufactured from composite materials, the wing spar web 810 may be bonded to the fuselage 220 using suitable adhesives. It should be understood that any mechanism for securing the wing spar web 810 to the fuselage 220 in a manner that allows shear stresses to be transferred from the wing spar web 810 to the fuselage 220 may be used without departing from the scope of this disclosure.

FIG. 9A shows an enlarged view of the upper portion of the fuselage 220 where the upper spar chord 806 penetrates the fuselage 220 and splices into an upper aircraft super frame 904. FIG. 9B shows a top view of the upper portion of the fuselage 220 where the upper spar chord 806 splices into the upper aircraft super frame. According to the embodiment shown in FIGS. 9A and 9B, the upper aircraft super frame cap 904 may be configured as an I-beam having an upper frame cap 906, a lower frame cap 907, and a web 910. The web 910 of the upper aircraft super frame 904 bisects the upper spar chord 806 of the wing spar 804 longitudinally such that the web 910 is sandwiched between the bisected portions of the upper spar chord 806. Alternatively, the upper spar chord 806 may be attached to a single side of the web 910 of the upper aircraft super frame 904.

Any number of fasteners 826 may be used to penetrate the upper spar chord 806 and web 910 to secure the upper spar chord 806 to the upper aircraft super frame 904. According to one implementation shown in FIG. 9B, the upper spar chord 806 tapers inward toward the web 910 of the upper aircraft super frame 904 prior to termination. Similarly, the upper spar cap 906 of the upper aircraft super frame 904 may taper inward to a termination point where the upper spar chord 806 penetrates the fuselage 220. Tapering these components allows the aircraft super frame 828 to receive the wing loads from the wing spar 804 in a uniform, constant manner and transfer them to the fuselage 220.

The circumferential clip 824 can be seen in FIG. 9A. As discussed above, the circumferential clip 824 may be secured to a surface of the fuselage 220 using fasteners 826. The flange 920 protrudes outwards from the contact surface of the clip for attachment to the wing spar web 810 using fasteners 826. The circumferential clip 824 contacts and is attached to the fuselage 220 from a position proximate to where the upper spar chord 806 penetrates the fuselage 220 to a position proximate to where the lower spar chord 808 penetrates the fuselage 220 in order to secure the wing spar web 810 and allow for loads to be transferred from the wing spar web 810 to the aircraft super frame 904.

Figure 10B:
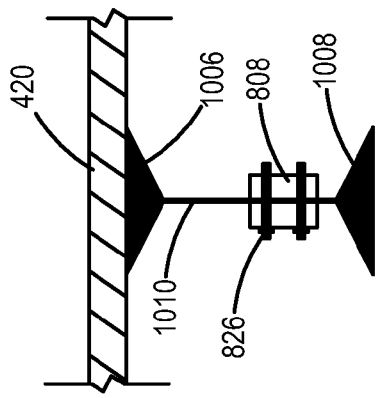
FIG. 10B shows a cross-sectional view of the splicing location cut along line B-B of FIG. 10A according to various embodiments presented herein.
Figure 10A:
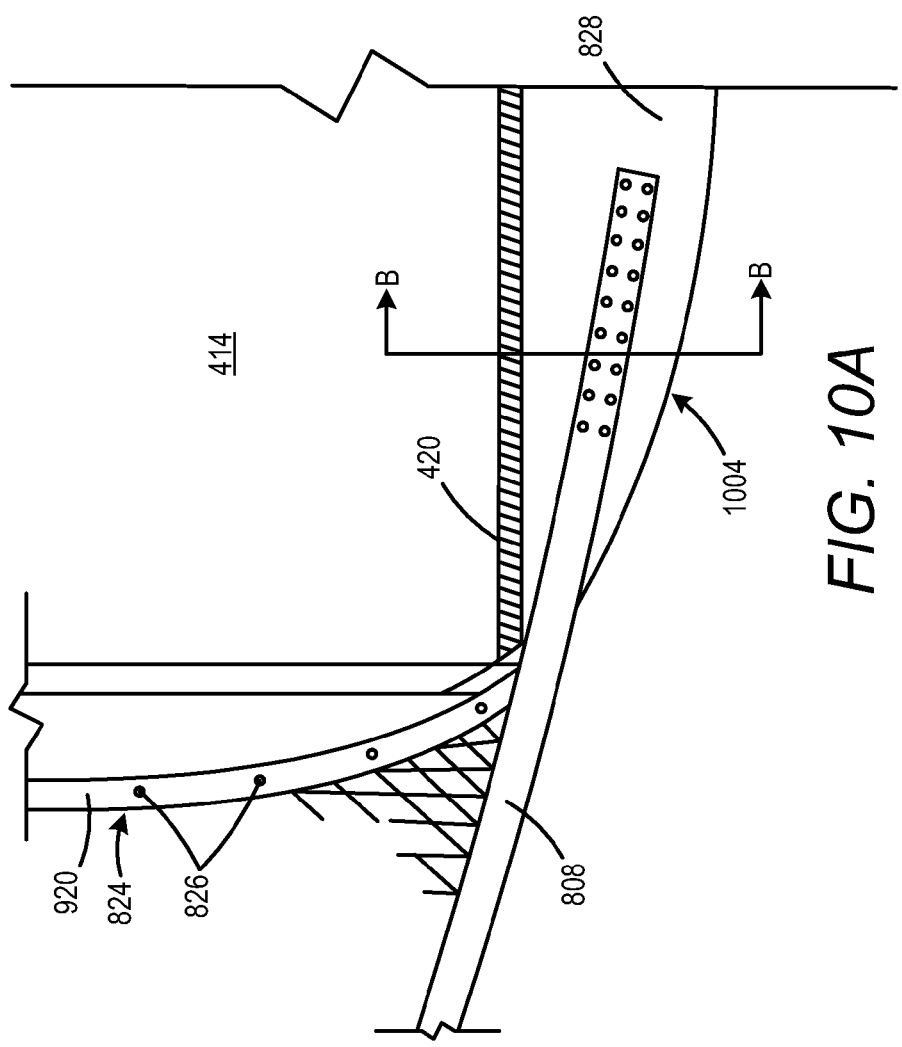
FIG. 10A is an enlarged view of a portion of FIG. 8 showing a splicing location of a lower spar chord into the aircraft fuselage according to various embodiments presented herein.

FIG. 10A shows an enlarged view of the lower portion of the fuselage 220 where the lower spar chord 808 penetrates the fuselage 220 and splices into a lower aircraft super frame 1004. The lower spar chord 808 may splice into the lower aircraft super frame 1004 in a similar manner as that described above with respect to the upper spar chord 806 splicing into the upper aircraft super frame 904. FIG. 10B shows a cross-sectional view of the splicing location cut along line B-B of FIG. 10A. It can be seen that the upper spar cap 1006 of the lower aircraft super frame 1004 supports the aircraft floor 420. The lower aircraft super frame 1004 additionally includes a lower frame cap 1008 and a web 1010 spanning between the upper frame cap 1006 and the lower frame cap 1008. The lower spar chord 808 sandwiches the web 1010 of the lower aircraft super frame 1004 and is secured to the frame using any number of fasteners 826. It should be understood that the upper spar chord 806 and the lower spar chord 808 may be connected to the aircraft super frame in the fuselage 220 using any technique suitable to secure the wing spar 804 to the fuselage 220 in a manner that will support the aircraft wings 218 and the corresponding loads experienced by the aircraft wings 218 during flight and ground operations.

Figure 11:
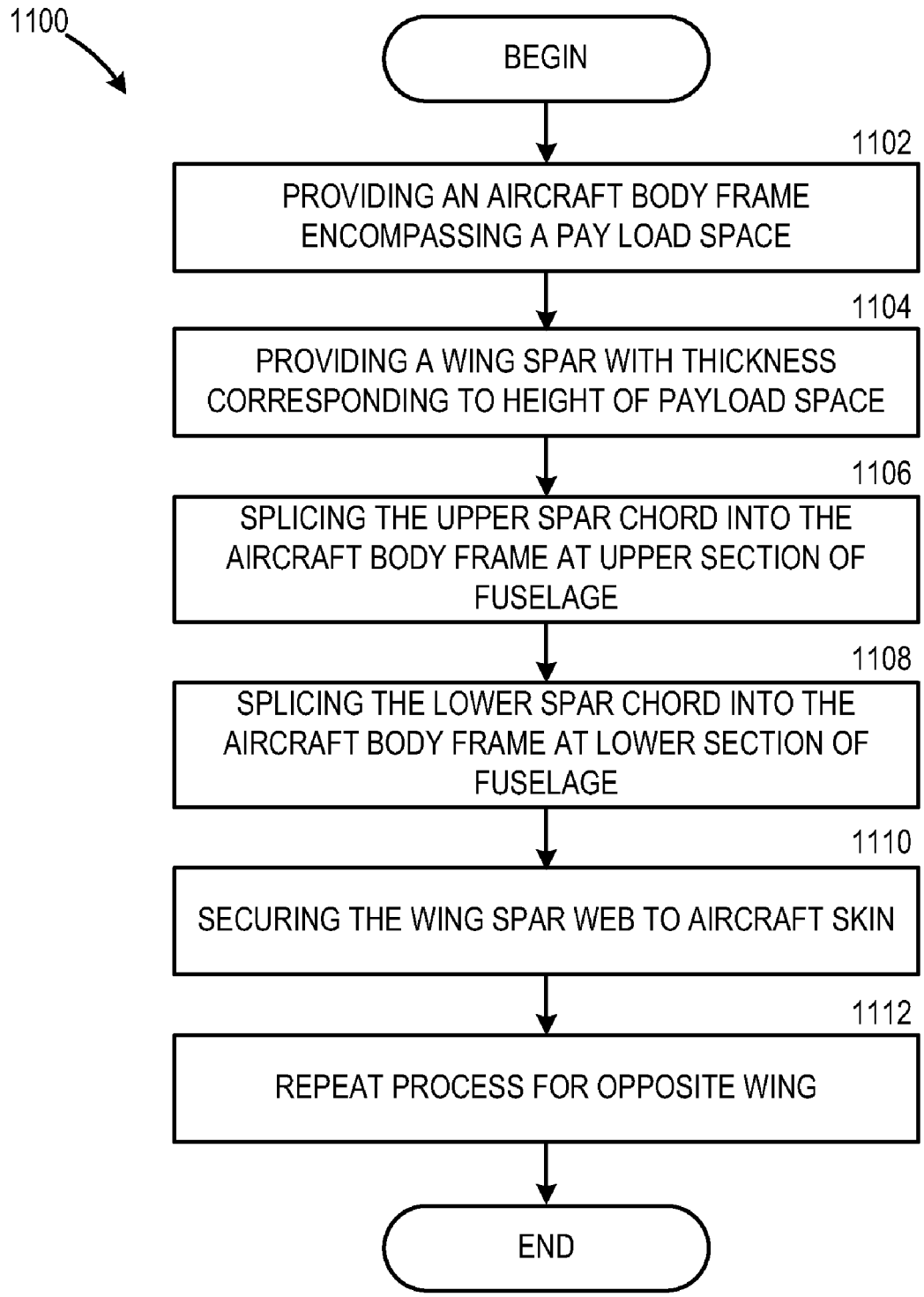
FIG. 11 is a flow diagram showing a method of providing a blended wing aircraft according to various embodiments presented herein.

Turning now to FIG. 11, an illustrative routine 1100 for providing a blended wing aircraft will now be described in detail. The routine 1100 begins at operation 1102, where an aircraft super frame is provided, which encompasses the payload space 414. At operation 1104, a wing spar 804 is provided. The wing spar 804 has a thickness 812 at the wing root that is substantially equivalent to the payload space height 814. The upper spar chord 806 is spliced into the upper aircraft super frame 904 at the upper section of the fuselage 220 at operation 1106, and the lower spar chord 808 is spliced into the lower aircraft super frame 1004 at the lower section of the fuselage 220 at operation 1108. At operation 1110, the wing spar web 810 is secured to the aircraft skin 408 or other fuselage 220 surface. As described above, this attachment may be made using a circumferential clip 824, bonding, or any other suitable mechanism. This process is repeated for the opposite wing 218 at operation 1112, and the routine 1100 ends.

Figure 12:
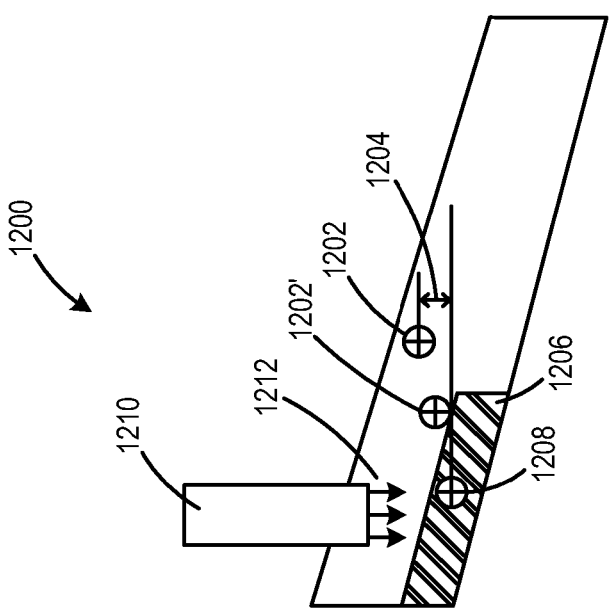
FIG. 12 shows a convention aircraft wing to illustrate the effects of upper surface blown flaps on a pitching moment of the aircraft.

FIG. 12 shows a conventional aircraft wing 218 to illustrate the effects of upper surface blown (USB) flaps 1206 on the pitching moment of a conventional aircraft 202. Aircraft that utilize USB technology will be referred to herein as powered-lift aircraft since USB technology creates additional lift using the exhaust flow from aircraft engines. It should be appreciated that there are additional types of powered-lift technology. Powered-lift aircraft in this context traditionally have the aircraft engines mounted forward on the wings such that the engine exhaust plume exits the engines and flows over a large portion of the upper surface of the wings and the flaps. The increased velocity of the gases within the exhaust plume as compared to the ambient air flowing over the outboard sections of the wings creates additional lift when routed over the wings and flaps behind the engines. By deploying the flaps within the engine exhaust plume, additional lift can be created from the increased air velocity and corresponding decreased air pressure on the top surface of the flaps. Additionally, as will be described in greater detail below, deploying the flaps may have the additional effect of turning the thrust vector upwards to assist in the creation of lift.

When aircraft 202 are designed, they are typically designed to meet specific performance criteria corresponding to a particular type of mission for which the aircraft 202 will be utilized. Aircraft characteristics often coincide with the performance criteria for which the aircraft 202 is designed. For example, as a general rule for a constant thickness to chord ratio, the slower the aircraft, the lower the wing sweep; the faster the aircraft, the higher the sweep. Powered-lift aircraft are conventionally built to maximize lift for transporting heavy loads and/or for creating short take-off and landing (STOL) capabilities. For this reason, many powered-lift aircraft employ minimum wing sweep with a relatively large leading edge radius to increase lift at the expense of speed.

FIG. 12 shows an example of a conventional powered-lift aircraft wing 1200. As discussed above, the conventional powered-lift aircraft wing 1200 typically has minimal wing sweep. The aircraft wing 1200 is shown with a center of lift 1202 at cruise flight conditions. An engine 1210 is mounted in a forward position in front of the USB flap 1206 so that the engine exhaust plume 1212 is directed over the USB flap 1206. When the USB flap 1206 is deployed, the powered lift is "turned on" and additional lift is created at the flap center of lift 1208. As will be described below, according to various embodiments of this disclosure, additional lift may also be created by manipulating the exhaust plume 1212 using engine nozzle controls with or without flap deployment. The additional lift generated by the activation of a powered-lift system has the effect of moving the center of lift 1202 rearward in the direction of the USB flap 1206, for example to the position indicated by center of lift 1202'. Moving the center of lift rearward creates a moment arm 1204 due to the distance between the original center of lift 1202 and the flap center of lift 1208.

The moment arm 1204 created by deploying the flaps 1206 in the exhaust plume 1212 or by manipulating the exhaust plume 1212 creates a pitching moment since the flaps 1206 are generally behind the aircraft center of gravity. Because of the additional lift that is generated a distance equivalent to the moment arm 1204 behind the original center of lift 1202, the center of lift 1202 is moved rearward, increasing the moment arm 1204 between the center of lift 1202 and the center of gravity. As a result of the increased moment arm 1204, aircraft stability and pitch is affected. This phenomenon that exists with conventional stable USB powered-lift aircraft is commonly controlled using a large horizontal stabilizer to provide a trim moment that counteracts the pitching moment induced by the activation of a powered-lift system.

Figure 13:
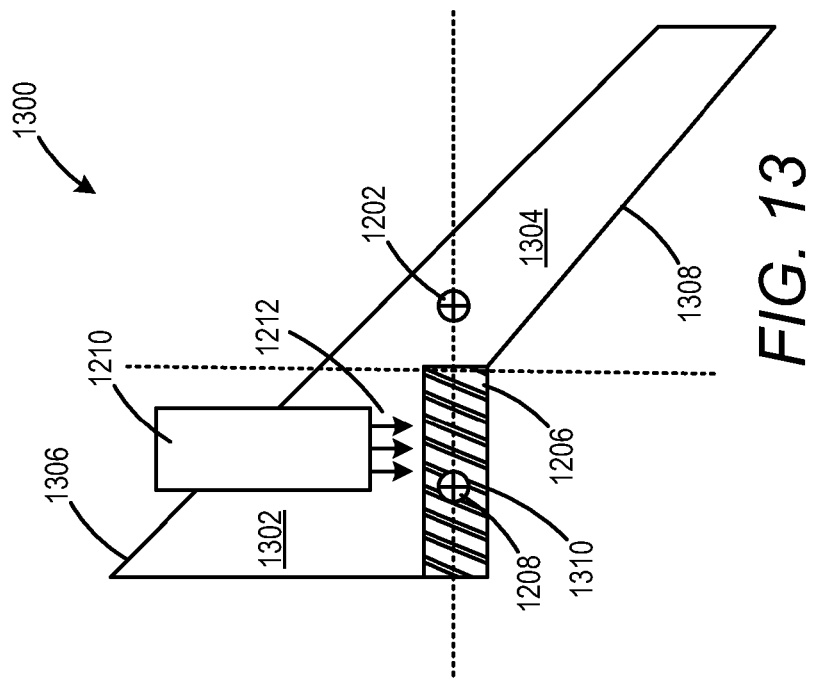
FIG. 13 shows a highly swept powered-lift aircraft wing according to various embodiments presented herein.

However, embodiments presented herein utilize wing sweep to bias the aircraft center of lift 1202 in a rearward position to reduce any moment arm 1204 created by the activation of a powered-lift system. FIG. 13 shows a highly swept powered-lift aircraft wing 1300 that includes an inboard portion 1302 and an outboard portion 1304. It should be understood that while the engine 1210 is shown mounted at least partially on the top surface of the inboard portion 1302, as described above, various embodiments provide for the mounting of engines 1210 internally within the wing with the exhaust plume 1212 routed through and over the top surface of the wing.

The inboard portion 1302 and the outboard portion 1304 share a leading edge 1306 that is swept rearward to a degree that positions the center of lift 1202 approximately along a lateral axis that includes the flap center of lift 1208 in cruise flight conditions. As seen in FIG. 13, the trailing edge 1308 of the outboard portion 1304 is swept rearward to a greater degree than the trailing edge 1310 of the USB flap 1206 of the inboard portion 1302. It should be appreciated, as will be described with respect to further embodiments below, that the trailing edge 1310 of the inboard portion 1302 of the highly swept powered-lift aircraft wing 1300 may be swept forward while the trailing edge 1308 of the outboard portion 1304 is swept rearward.

The amount of sweep of the leading edge 1306 and of the trailing edges 1308 and 1310 depends upon specific performance goals of the aircraft 202 and characteristics of the highly swept powered-lift aircraft wing 1300, but with other contributing factors fixed, leading edge 1306 and trailing edges 1308 and 1310 should be swept to a degree that positions the center of lift 1202 proximate to the flap center of lift 1208 so as to minimize or eliminate the moment arm 1204 upon the activation of any powered-lift system. According to various embodiments, the leading edge 1306 is swept rearward approximately 10-50 degrees, the trailing edge 1310 is swept forward approximately −10-50 degrees, and the trailing edge 1308 is swept rearward approximately 10-50 degrees. According to one specific embodiment, the leading edge 1306 is swept rearward approximately 40 degrees, the trailing edge 1310 is swept forward approximately 35 degrees, and the trailing edge 1308 is swept rearward approximately 35 degrees. It should be understood that other aerodynamic design considerations may be utilized to shift the center of lift 1202 to a desired position. As an example, geometric and/or aerodynamic twist may be used in the aircraft wing to affect the position of the center of lift 1202.

When the USB flap 1206 of the highly swept powered aircraft wing 1300 is deployed or when the exhaust plume is manipulated to activate the powered-lift capabilities of the aircraft 202 of FIG. 13, the flap center of lift 1208 does not create any, or creates a very small, moment arm 1204 since the flap center of lift 1208 and the center of lift 1202 are each approximately positioned along the same lateral axis depicted by the horizontal broken line. As a result, the trim moment required by the tail section of the aircraft 202 to counter the moment arm 1204 is greatly reduced, allowing the horizontal stabilizer of the aircraft 202, or stabilator or other applicable control surfaces on the tail section, to be reduced in size as compared to conventional USB powered-lift aircraft 1200. By allowing the tail surfaces to be smaller, weight and drag is reduced, not only during STOL operations, but throughout the aircraft mission.

As discussed above, conventional powered-lift aircraft 1200 are typically designed with a minimally swept leading edge and a high thickness to chord ratio to create high amounts of lift, or a high coefficient of lift, during operation at subsonic speeds. Conventionally, as aircraft are designed for cruising speeds in the transonic and supersonic ranges, wing thickness to chord ratio decreases and wing sweep increases. However, according to aspects of the disclosure provided herein, transonic cruise speeds may be obtained while additionally providing the powered-lift cargo aircraft 302 with STOL capabilities.

As previously described, aspects of the disclosure include a wing root thickness that is substantially similar to the payload space height 814. This wing thickness results in a leading edge 1306 that has a leading edge radius that is greater than that of traditional highly swept wings. The larger leading edge radius increases the lift coefficient to a degree that substantially offsets or minimizes any loss of lift coefficient that would typically result from sweeping the leading edge 1306 rearward to a degree represented by the highly swept powered-lift aircraft wing 1300, i.e. 40 degrees. For this reason, the thick leading edge radius, the powered-lift system that includes deploying the flaps 1206 in the exhaust plume 1212 or by manipulating the exhaust plume 1212 as described below, and the highly swept leading edge 1306 provides the powered-lift cargo aircraft 302 with transonic cruise and STOL capabilities, while minimizing the size of the tail surfaces that control any pitching moments created by the activation and deactivation of the powered-lift systems.

Figure 14:
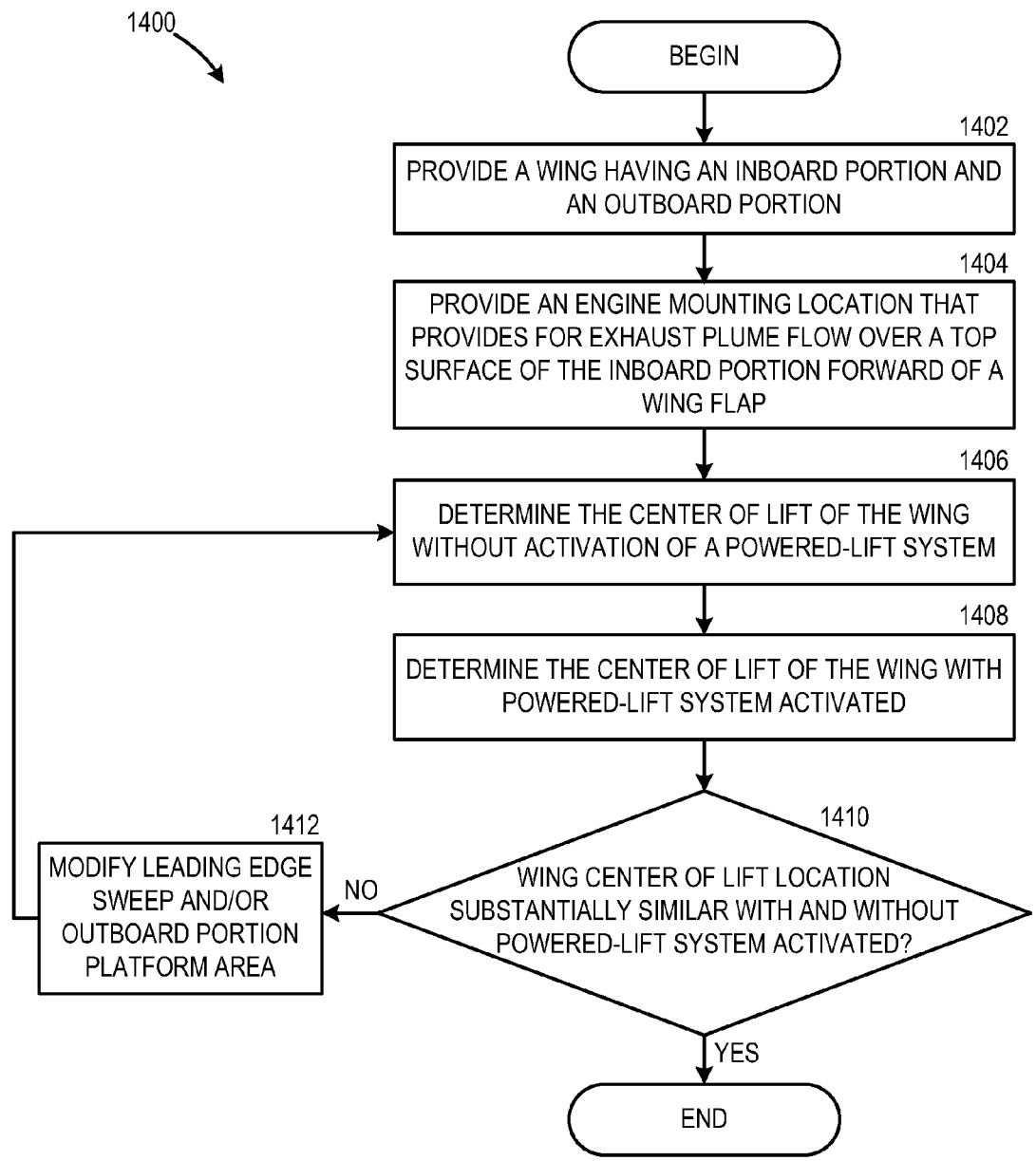
FIG. 14 is a flow diagram showing a method of providing a highly swept-wing aircraft according to various embodiments presented herein.

Turning now to FIG. 14, an illustrative routine 1400 for providing a swept-wing powered-lift aircraft will now be described in detail. The routine 1400 illustrates a high level process used to design a cargo aircraft 302 having transonic cruise and STOL capabilities according to the disclosure presented herein. It should be understood that the routine 1400 particularly illustrates wing sweep considerations as the sweep angles correspond to the location of the center of lift 1202 of the highly swept powered-lift aircraft wing 1300 and does not include the many other variables that factor into the design of the highly swept powered-lift aircraft wing 1300. For example, the exact sweep angles and wing planform configurations will depend on the aircraft size, designed cruise speed, designed lift coefficients, survivability considerations, and aircraft mission, among many other factors.

The routine 1400 begins at operation 1402, where a highly swept powered-lift aircraft wing 1300 is provided. The wing has an inboard portion 1302 and an outboard portion 1304. According to various embodiments, such as the highly swept powered-lift aircraft wing 1300 shown in FIG. 13, the inboard portion 1302 and the outboard portion 1304 share a straight leading edge 1306 with identical sweep, but have a trailing edge 1308 that changes sweep from the inboard portion 1302 to the outboard portion 1304. From operation 1402, the routine 1400 continues to operation 1404, where an engine mounting location is provided on or within the inboard portion 1302 of the wing at a position that routes the engine exhaust plume 1212 over a top surface of the wing forward of a USB flap 1206. This position allows for the activation of a powered-lift system that utilizes the engine exhaust plume 1212 to increase the lift created by the wing 1300 and USB flap 1206. As described herein, activation of the powered-lift system according to various embodiments may include deployment of the USB flap 1206 and/or utilizing the engine exhaust nozzle to manipulate the engine exhaust plume 1212 in a manner that stimulates the spreading and attachment of the exhaust plume 1212 to the USB flap 1206 to increase lift.

The routine 1400 continues from operation 1404 to operation 1406, where the center of lift 1202 of the wing 1300 is determined while the powered-lift system is deactivated. At operation 1408, the center of lift 1202 is calculated with the powered-lift system activated and the two positions are compared at operation 1410 to determine whether the center of lift 1202 is substantially at the same position with and without the powered-lift system activated. For example, looking at FIG. 13, a primary factor in any change in location of the center of lift 1202 during flight operations is the increase in lift associated with the activation of a powered-lift system or the decrease in lift associated with the deactivation of the powered-lift system. The location where the change in lift is experienced is represented by the flap center of lift 1208. If the center of lift 1202 is substantially aligned with the flap center of lift 1208 along the pitch axis represented in FIG. 13 by the broken horizontal line, then any moment arm 1204 created from the increase or decrease in lift at the flap center of lift 1208 upon activation or deactivation of the powered-lift system is minimized or eliminated.

It should be appreciated that the disclosure provided herein is not limited to a sweep angle of the leading edge 1306 and planform area of the outboard portion 1304 that places the center of lift 1202 exactly aligned with the flap center of lift 1208 in a manner that eliminates any moment arm 1204. Rather, due to variable flight conditions and various operating characteristics of the powered-lift system, the lift created and altered by the powered-lift system may dynamically shift the center of lift 1202 during flight in a manner that creates a moment arm 1204. However, due to the highly-swept leading edge 1306, coupled with the other characteristics of the outboard portion 1304 that shifts the center of lift 1202 aft in comparison with a conventional high-lift aircraft 202, the moment arm 1204 is minimized.

Returning to FIG. 14, if it is determined at operation 1410 that the center of lift 1202 is not located in substantially the same position with and without the powered-lift system activated, then the routine 1400 proceeds to operation 1412, where the sweep angle of the leading edge 1306 is modified and/or other characteristics such as the planform area of the outboard portion 1304 is modified to shift the center of lift 1202 without the activation of the powered-lift system in a desirable direction to coincide with the center of lift 1202 with the powered-lift system activated. As discussed above, any other design variables may be modified to shift the center of lift 1202. The routine 1400 returns to operation 1406 and continues as described above. However, if at operation 1410, it is determined that the center of lift 1202 is located in substantially the same position with and without the powered-lift system activated, then the routine 1400 ends.

Figure 15A:
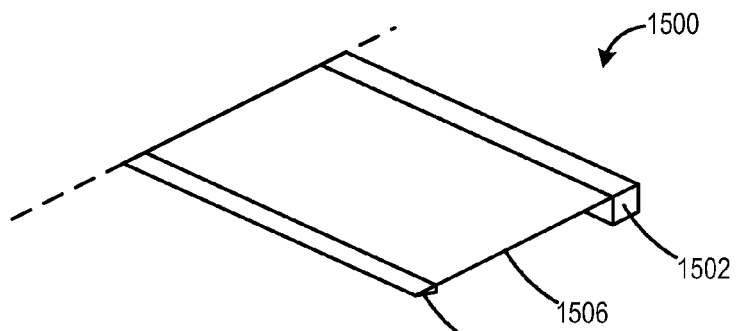
FIGS. 15A-15C are perspective views of a conformal upper surface blown flap in various stages of deployment according to various embodiments presented herein.
Figure 15B:
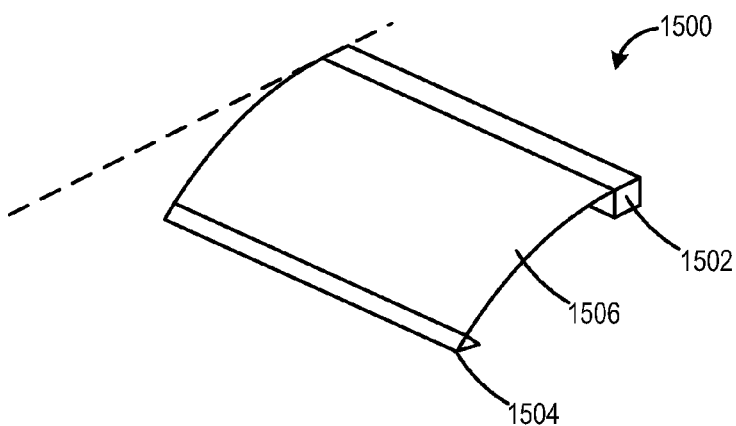
Figure 15C:
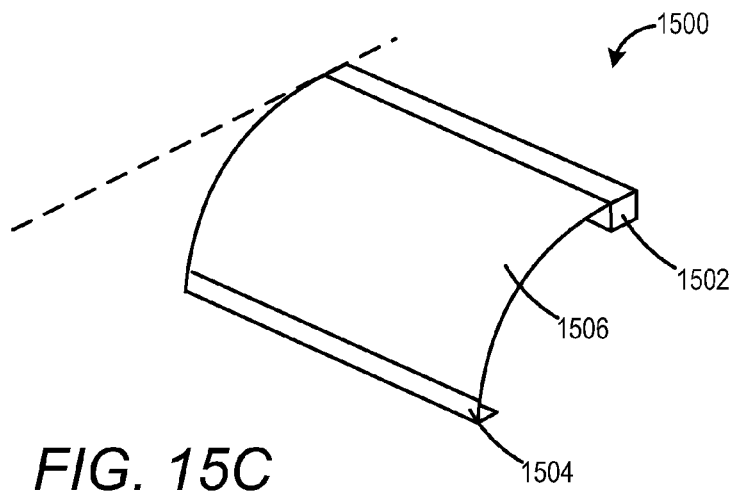

Turning now to FIGS. 15A-15C, an embodiment in which the cargo aircraft 302 utilizes conformal flaps 1500 will be described. Conventional powered-lift aircraft may utilize USB flaps 1206 that include one or more rigid surfaces, or flap extensions, that deploy aft of a main flap portion to create a downward-curved upper flap surface that turns the engine exhaust plume 1212 downward. This running length of the USB flap 1206 provides additional surface area that creates lift and turns the thrust vector upwards, each action enhancing the low speed flight performance of the aircraft 202, which may provide or enhance STOL performance capabilities. However, there are limitations to conventional USB flap systems.

First, the amount of downward deflection, or the radius of curvature of the USB flaps 1206 when extended, is typically limited by the space within the wing for stowing the flap extensions. For example, the thickness of the portion of the wing in which flap extensions are stored may limit the radius of the curvature of the USB flaps 1206 when extended. Conventionally, for USB flap systems, a R/h parameter of 2.0 or greater may be desired, with R being the radius of curvature of the USB flap in a deployed configuration and h being the height of the engine exhaust plume 1212. It should be understood that additional factors are considered when designing a USB flap system, including but not limited to the magnitude of engine thrust, the velocity profile of the engine exhaust plume 1212, as well as the width and length of the USB flap 1206 in the deployed configuration.

Testing of conventional USB flap system utilizing a 50-degree deployable USB flap 1206 with embodiments of the cargo aircraft 302 described herein resulted in a R/h parameter of approximately 1.85 or less due to limitations in the allowable radius of curvature, and consequently in the allowable running length of the curved upper surface, of the USB flap 1206 caused by stowage limitations. Flap extension stowage limitations may be exacerbated by the structure of the wing. For example, structural components within the wing, such as a wing spar, can interfere with the space needed for stowing the flap extensions.

Another limitation to a conventional USB flap system is that when the flap extensions are deployed, the trailing edge of the wing is moving aft such that the distance from the leading edge to the trailing edge at the wing root is increasing. Moving the trailing edge rearward can present a problem when the aircraft 202 is not a high-wing aircraft. In a mid-wing or low-wing configuration, deploying traditional USB flaps may move the trailing edge aft and downward to a position that is close enough to the ground to present a danger of contact with the ground during takeoff and landing operations when the aircraft is operating at a high angle of attack. In addition, to deflect traditional hinged USB flaps, large aerodynamic fairings are required. These fairings may cause high drag, and undesirably increase the radar cross-section of the aircraft.

To address these limitations with conventional USB flap systems, one embodiment presented herein utilizes the conformal flap system 1500 shown in FIGS. 15A-15C. FIGS. 15A-15C illustrate the conformal flap system 1500 in the stowed, 20 degree deflection, and 60 degree deflection positions, respectively. As seen in FIG. 15A, the conformal flap system 1500 provides for a one-piece flap that is substantially flat in the stowed configuration. As the flap is deployed, as seen in FIGS. 15B and 15C, a flap leading edge 1502 that is attached to a trailing edge of a highly swept powered-lift aircraft wing 1300 remains fixed while a flap trailing edge 1504 is rotated downward in a manner that provides for the flap surface 1506 to sweep downward in an arc to provide a smooth, continuous running length for the engine exhaust plume 1212.

It should be appreciated that the conformal flap system 1500 shown in FIGS. 15A-15C has been simplified for illustrative purposes and does not include any of the actuation mechanisms used to deploy the flap. One or more actuators may be utilized to rotate or otherwise modify internal structural components of the conformal flap system 1500 to alter the external shape of the flaps during deployment or retractions. It should be understood that any suitable flexible skin material may be utilized for the flap surface 1506. As an example, the flap surface 1506 may include a titanium or shaped memory alloy such as NiTinol.

Because the entire flap surface 1506 is exposed to the engine exhaust plume 1212 during flight, with or without deployment of the conformal flap system 1500, space within the wing is not required for stowing any portion of the flap and the entire running length of the flap surface 1506 may be utilized to create lift during all flight phases. For this reason, and because the conformal flap system 1500 allows for a smooth transition in the camber of the flaps through any deflection angle, the conformal flap system 1500 may be used to provide optimal aerodynamic performance during takeoff, landing, and cruise flight operations.

For example, for optimal aerodynamic and propulsion performance in level flight cruise conditions, the flap surface 1506 may be approximately flat and slightly sloping downward 0-5 degrees towards the trailing edge. At takeoff, the flap surface 1506 may be slightly deflected in a shallow arc such that the surface slope is deflected approximately 0-20 degrees downward. At landing, the running length of the flap surface 1506 may be aggressively deformed in a downward arc approximately 50-75 degrees, and even up to 90 degrees. It should be understood that these deflection angles are disclosed for illustrative purposes only and are not to be construed to be limiting.

Additionally, the conformal flap system 1500 provides an advantage over conventional USB flap systems in that the flap trailing edge 1504 may translate downward and even forward when deployed as viewed from the top. This contrasts conventional USB flap systems that extend rearward as described above. As a result, the conformal flap system 1500 provides greater ground clearance than conventional USB flap systems, particularly when utilized with a blended wing cargo aircraft 302 in which the flaps are positioned closer to the ground than with traditional high-wing aircraft. Moreover, because the conformal flap system 1500 is not hinged, there are no external hinges and associated hardware that may add drag or increase the radar signature of an aircraft.

Turning now to FIG. 16, a controllable USB nozzle aperture 1600 will be described according to one embodiment of the disclosure provided herein. As discussed briefly above, USB flaps 1206 turn the thrust vector created from the aircraft engines 1210 upward by turning the engine exhaust plume 1212 downward. Conventionally, powered-lift aircraft such as USB aircraft are designed with engines 1210 mounted on top of the wing and positioned forward on the wing so that the distance between the engine nozzle exit plane and the trailing edge of the wing includes a significant portion of the wing chord. Doing so allows for the spreading of the engine exhaust plume 1212 prior to reaching the USB flap 1206 for maximum effect. To facilitate spreading, traditional powered-lift aircraft utilize fixed, downward-sloped duct ceilings at the exit of the engine nozzle. However, this configuration creates significant drag penalties in terms of boat-tail drag and scrubbing drag during cruise.

For the purposes of this disclosure, boat-tail drag refers to the aerodynamic drag created by the pressure drag and/or separation of airflow over a surface due to an alignment change of a component with respect to the local airflow over that component. For example, with a conventional powered-lift aircraft, the external airflow over the fixed downward-sloped duct ceilings at the exit of the engine nozzle separates from the sloped nozzle exit, creating a turbulence or boat-tail drag during cruise flight conditions. Scrubbing drag refers to the skin friction drag caused by the increased velocity of the engine exhaust plume 1212 over the top surface of the aircraft wing and flap as compared to the ambient airflow over the rest of the aircraft.

Aspects of the disclosure provided herein utilize a controllable USB nozzle aperture 1600 to manipulate the engine exhaust plume 1212 from one or more engines 1210 in a manner that optimizes the creation of lift during all phases of flight while minimizing boat-tail and scrubbing drag. Looking at FIGS. 16A and 16B, the controllable USB nozzle aperture 1600 includes an upper duct surface 1602, a side duct surface 1604, and a lower duct surface 1606. FIG. 16B is a cross-sectional view taken along line A-A of FIG. 16A. As will be described further below with respect to FIG. 22, the controllable USB nozzle aperture 1600 may be attached to one or more common nozzle portions that are each identical for all engines 1210 and that may include the nozzle throat.

It should be appreciated that FIGS. 16A-18B show a controllable USB nozzle aperture 1600 that corresponds to two adjacent engines 1210. The controllable USB nozzle aperture 1600 includes a bifurcating septum vane 1612 that separates flows from adjacent engines 1210. The bifurcating septum vane 1612 may be controllable to vary the geometry of the bordering exit apertures 1608. The bifurcating septum vane 1612 may operate to keep the inboard and outboard exit apertures 1608 of adjacent inboard and outboard controllable USB nozzle apertures 1600 at equal areas during all engine operating conditions. In doing so, the bifurcating septum vane 1612 may be moveable such that an aft end of the bifurcating septum vane 1612 moves inboard and outboard in a manner similar to the side duct surface 1604 as described below, and according to one embodiment, in coordination with the side duct surface 1604.

It should be understood that although the controllable USB nozzle aperture 1600 is shown to control engine exhaust plumes 1212 from two adjacent engines 1210, each controllable USB nozzle aperture 1600 may provide engine exhaust plume 1212 control for any number of engines 1210 without departing from the scope of this disclosure. While the specific geometry of the controllable USB nozzle apertures 1600 may differ from that shown according to the specific implementation, the components described with respect to the controllable USB nozzle aperture 1600 shown in FIGS. 16A-18B may be applicable for all nozzle apertures.

Looking at FIGS. 16A and 16B, according to various embodiments, the upper duct surface 1602, the side duct surface 1604, and the lower duct surface 1606 may each be separately moveable during flight operations to alter the geometry of a nozzle exit aperture 1608 through which the engine exhaust plume 1212 (depicted by the large arrows) exits and flows over the USB flaps 1206. The upper duct surface 1602 is shown as a moveable panel that pivots from an open position down to a closed position. In the open position shown in FIGS. 16A and 16B, the upper duct surface 1602 may be substantially parallel with the external airflow over the aircraft wing 1300. In this position, the boat-tail drag that is common for a traditional USB nozzle aperture due to the fixed downward slope of the upper surface of the nozzle aperture is minimized or eliminated altogether. Because the upper duct surface 1602 is parallel to the ambient airflow over the wing when configured in the open position, no separation occurs within the airflow over the upper duct surface 1602.

Although not limited to this configuration, FIGS. 16A and 16B illustrate one possible USB flap 1206 and controllable USB nozzle aperture 1600 configuration that may be utilized during cruise flight operations. With the upper duct surface 1602 in the raised position, the side duct surface 1604 in the closed position, and the lower duct surface 1606 in the lowered position, the nozzle throat is positioned just upstream of the controllable USB nozzle aperture 1600 and the exit aperture 1608 is configured at its maximum height and minimum width. The engine exhaust plume 1212 flows out of the exit aperture 1608 in a direction substantially parallel with a fuselage reference plane and ambient airflow. As discussed above, with the upper duct surface 1602 in the raised position, the ambient airflow does not separate from the upper duct surface 1602 and boat-tail drag is eliminated or minimized. The scrubbing drag that exists along the running length of the upper surface of the wing and the USB flap 1206 from contact with the high-velocity flow of the engine exhaust plume 1212 is also reduced when the height of the exit aperture 1608 is maximized and the width is minimized. Embodiments described below with respect to FIGS. 18A and 18B utilize the lower duct surface 1606 to further minimize this scrubbing drag.

Looking now at FIGS. 17A and 17B, a closed configuration according to one embodiment of the controllable USB nozzle aperture 1600 will be described. This embodiment shows a configuration that may be utilized to thin and spread the engine exhaust plume 1212 as it exits the exit aperture 1608 to condition the engine exhaust plume 1212 for high-lift operations, such as during STOL operations. To create the closed configuration, the upper duct surface 1602 is rotated downward to a maximum kick-down angle such that the trailing edge 1610 of the upper duct surface 1602 is proximate to the lower duct surface 1606. In doing so, the height of the nozzle exit aperture 1608 is minimized to "pinch" the engine exhaust plume 1212 and spread it out over a larger surface area of the USB flaps 1206.

Simultaneously as the upper duct surface 1602 is lowered, the side duct surface 1604 may be opened by rotating the panel to the side away from the exit aperture 1608. Opening the side duct surface 1604 maximizes the width of the exit aperture 1608 to allow the engine exhaust plume 1212 to further fan out laterally to ensure full coverage over the USB flaps 1206. According to one embodiment, the area of the exit aperture 1608 remains substantially constant in both the open and closed configurations shown in FIGS. 16A and 17A, respectively; however, the present disclosure is not limited to maintaining a fixed exit aperture area.

Looking at FIG. 17B, when the controllable USB nozzle aperture 1600 is in a closed configuration, the thinning and spreading of the engine exhaust plume 1212 allows the flow to remain attached to the USB flaps 1206 through a significantly greater deflection angle than when the controllable USB nozzle 1600 is in an open configuration with the upper duct surface 1602 raised and the exit aperture 1608 at its maximum height. The benefits of delaying separation of the exhaust flow from the USB flaps 1206 are twofold. First, additional propulsive lift is created due to decreased pressures on the top surface of the USB flaps 1206 resulting from the attachment of the engine exhaust plume 1212. Second, turning the engine exhaust plume 1212 downward to follow the contour of the deflected USB flaps 1206 turns the thrust vector upwards, creating an upward force that further allows the cargo aircraft 302 to operate at slower airspeeds.

According to another embodiment, the trailing edge 1610 of the upper duct surface 1602 is swept forward from an inboard side closest to the fuselage to an outboard side closest to the wing tip. The trailing edge 1310 of the flap may be similarly swept such that it is substantially parallel with the trailing edge 1610 of the upper duct surface 1602. When the upper duct surface 1602 is configured with a maximum kick-down angle so that the controllable USB nozzle aperture 1600 is in a closed configuration, then the internal geometry of the nozzle has been scheduled such that the throat of the nozzle moves from a position upstream to the controllable USB nozzle aperture 1600 to the exit plane at the trailing edge 1610 of the upper duct surface 1602. Although the area of the exit aperture 1608 may not have changed during the transition from the open configuration to the closed configuration, the area of the original throat may have increased such that it becomes larger than that at the exit plane. It should be understood that the position of the nozzle throat may not change with the modification of the exit aperture 1608. Maintaining the throat forward of the controllable USB nozzle aperture 1600 has advantages that will be discussed below with respect to FIGS. 22 and 23.

As seen in FIG. 17A, by making the forward-swept exit plane the throat, the engine exhaust plume 1212 now flows through the exit aperture 1608 substantially normal to the forward-swept exit plane. Consequently, the corresponding thrust vector is turned inward toward the fuselage. For example, if the trailing edge 1610 of the upper duct surface 1602 is swept forward 35 degrees, then the thrust vector is turned inward approximately 35 degrees when the controllable USB nozzle aperture 1600 is transitioned to the closed configuration. The turning of the thrust vector and the corresponding benefits of doing so will be described in further detail below with respect to FIGS. 19A-20C.

Figure 18B:
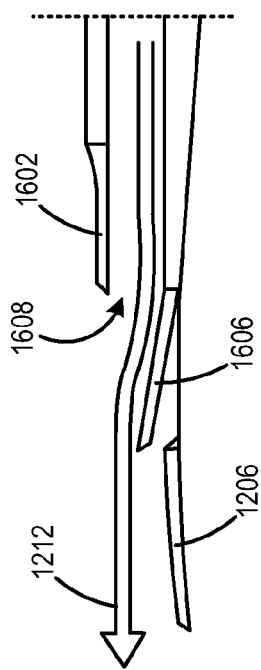
Figure 18C:
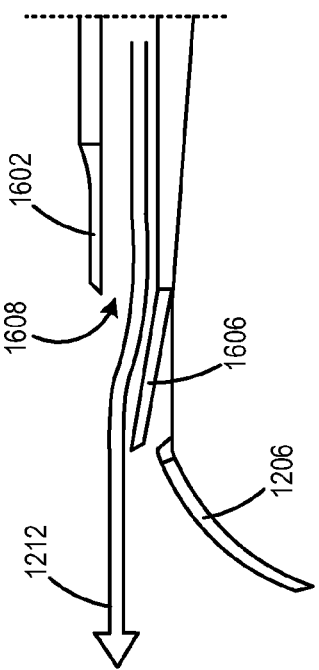
Figure 18A:
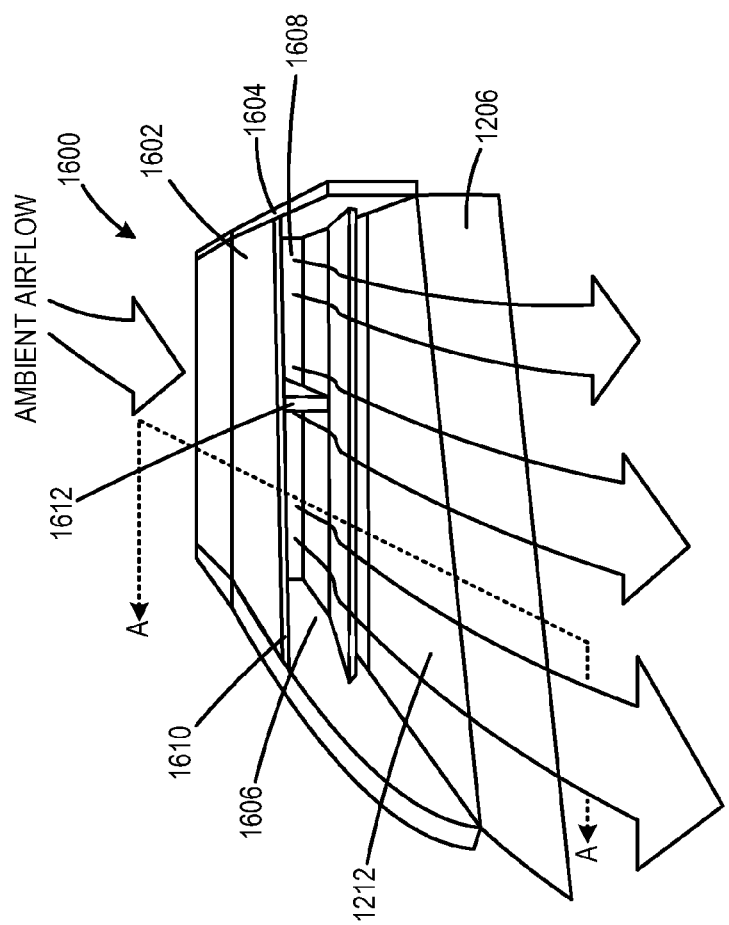

FIGS. 18A and 18B illustrate the operation of the lower duct surface 1606 according to various embodiments. The lower duct surface 1606 operates similarly to the upper duct surface 1602 in that it may be rotated up and down to manipulate the engine exhaust plume 1212. FIGS. 18A and 18B show the controllable USB nozzle aperture 1600 in the open configuration that may be utilized during cruise flight conditions. As discussed above, this configuration may eliminate boat-tail drag. Scrubbing drag is reduced by maximizing the height and minimizing the width of the engine exhaust plume 1212 to reduce the scrubbing area along the running length of the wing and USB flaps 1206 that is in contact with the exhaust flow.

However, the scrubbing drag may be further reduced due to the controllability of the lower duct surface 1606. According to various embodiments, the lower duct surface 1606 may be raised to a kick-up angle that separates the engine exhaust plume 1212 from the upper surface of the wing and the USB flaps 1206 that are in the downstream flow field of the exhaust plume. FIG. 18B shows the lower duct surface 1606 in a raised position, separating the flow of the engine exhaust plume 1212 downstream of the exit aperture 1608. This configuration may be beneficial during cruise conditions to minimize drag and improve flight efficiencies, or during a landing go-around to quickly reorient the thrust vector for maximum forward thrust.

This configuration may also be used to balance an engine-out rolling moment. When an engine 1210 goes out during high-lift operations, the loss of lift on one side of the aircraft can cause a rolling moment that must be countered, either through pilot input or computing system 216 input. This balance can be accomplished by rotating the lower duct surface 1606 up under the engine exhaust plume 1212 on the side of the aircraft opposite the side with the engine failure to reduce its associated lift, and to consequently balance the rolling moment FIG. 18C illustrates a configuration in which the lower duct surface 1606 is raised during a high-lift operation and the corresponding detachment of the engine exhaust plume 1212 from the top surface of the USB flap 1206.

Turning now to FIGS. 19A-19C, characteristics of the engine exhaust plume 1212 flows and corresponding thrust vectors when the controllable USB nozzle apertures 1600 are configured in the open configuration shown in FIGS. 16A and 16B are illustrated. FIG. 19A shows a plan view of a cargo aircraft 302 in cruise flight according to one embodiment described herein. During cruise flight, when the controllable USB nozzle apertures 1600 are configured in an open configuration, the engine exhaust plumes 1212 flow substantially rearward and parallel to the aircraft direction of flight, which is represented by the X-axis of the X-Y-Z coordinate system that has been overlaid on the cargo aircraft 302. As seen, the orientation of the engine exhaust plumes 1212 creates opposite thrust vectors 1902 that are aligned with the X-axis. FIGS. 19B and 19C are visual representations of the thrust vectors 1902 depicted in the X-Y and Z-X planes, respectively, of the coordinate system of FIG. 19A.

FIGS. 20A-20C represent characteristics of the engine exhaust plume 1212 flows and corresponding thrust vectors when the controllable USB nozzle apertures 1600 are configured in the closed configuration shown in FIGS. 17A and 17B. As discussed above, moving the throat of the nozzles to the exit planes turns the engine exhaust plumes 1212 in a direction normal to the trailing edge 1610 of the upper duct surfaces 1602. The effect of this turning, coupled with the subsequent thinning of the exhaust flows and attachment of the flows to the deployed USB flaps 1206, turns the thrust vectors 1902 upward and inward toward the fuselage.

As seen in FIG. 20B, the thrust vector 1902 is angled inward toward the fuselage, or X-axis, an amount corresponding to the degree of forward sweep of the trailing edge 1610 of the upper duct surface 1602. The benefits of this inward turning of the thrust vector 1902 are twofold. First, the component of the thrust vector 1902 that is in the direction of flight is shortened. This allows a higher engine thrust setting for a given approach flight path slope, which in turn provides a higher lift component of the thrust vector 1902. The higher thrust setting and corresponding lift increase reduces the required field landing length. Another benefit of the inward turning of the thrust vector 1902 is that it reduces the moment arm of the thrust vector 1902 with respect to the aircraft center of mass location. This benefit reduces the implications of an engine-out situation of landing approach, as it reduces the yawing moment of the failed system. So, if an engine 1210 were to fail on landing approach, the tendency of the cargo aircraft 302 to rotate around the Z-axis shown in FIG. 20A in the direction of the failed engine 1210 would be less severe.

FIG. 20C shows that the thrust vector 1902, in addition to being angled inward, is also angled upward. The upward turn also shortens the component of the thrust vector 1902 in the direction of flight, which acts to reduce the required field landing length for the reasons described above with respect to the inward turning of the thrust vector 1902. Moreover, the upward turn of the thrust vector 1902 supplements the lift, further aiding STOL and other low-speed operations.

Figure 21:
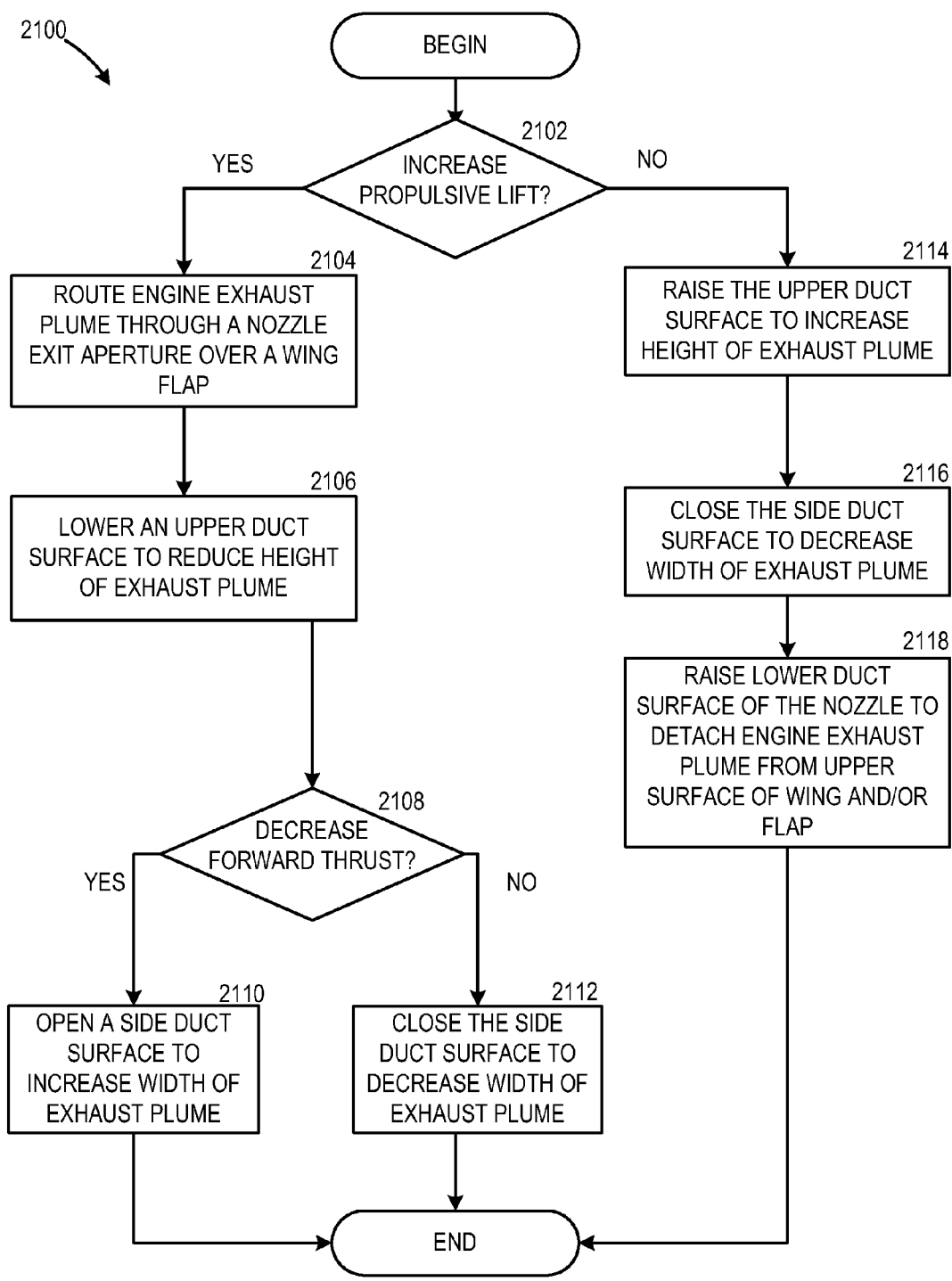
FIG. 21 is a flow diagram showing a method of modifying propulsive lift and thrust using a controllable upper surface blown nozzle aperture according to various embodiments presented herein.

Turning to FIG. 21, a routine 2100 for controlling propulsive lift and thrust with a controllable USB nozzle aperture 1600 will be described in detail. The routine 2100 begins at operation 2102, where a determination is made as to whether or not propulsive lift is to be increased. The propulsive lift is the lift created by the increased velocity of the engine exhaust plume 1212 over the USB flaps 1206 as compared to the ambient airflow over the aircraft. It would be desirable to increase the propulsive lift during takeoff and landing operations and to maintain or decrease the propulsive lift during cruise operations, for instance.

If it is determined that the propulsive lift is not to be increased, then the routine 2100 proceeds to operation 2114 and continues as described below. However, if a decision is made to increase the propulsive lift, then the routine 2100 continues from operation 2102 to operation 2104, where the engine exhaust plume 1212 is routed through an exit aperture 1608 of a controllable USB nozzle aperture 1600 over a USB flap 1206. The nozzle aperture 1600 guides the engine exhaust plume 1212 from the engine 1210 to the USB flaps 1206; however, if the lower duct surface 1606 is in the raised position, then the lower duct surface 1606 may be lowered to re-attach the engine exhaust plume 1212 to the upper surface of the wing and USB flaps 1206 downstream in the flow field.

From operation 2104, the routine 2100 continues to operation 2106, where the upper duct surface 1602 is kicked down to reduce the height of the exit aperture 1608 and the engine exhaust plume 1212. The routine continues from operation 2106 to operation 2108, where a determination is made as to whether or not forward thrust is to be decreased. For example, during landing operations, it may be desirable to decrease the forward thrust component to slow the aircraft. If forward thrust is to be decreased, then at operation 2110, the side duct surface 1604 may be opened to increase the width of the exit aperture 1608 and spread the engine exhaust plume 1212, and the routine 2100 ends. However, if at operation 2108, it is determined that the forward thrust is not to be decreased, then the routine 2100 proceeds to operation 2112, where the side duct surface 1604 is closed. Doing so while the upper duct surface 1602 is kicked down may maximize the thrust and propulsive lift created, which would be desirable during takeoff operations. From operation 2112, the routine 2100 ends.

Returning to operation 2102, if a determination is made not to increase the propulsive lift, such as during cruise conditions, then the routine 2100 proceeds from operation 2102 to operation 2114, where the upper duct surface 1602 is raised to increase the height of the exit aperture 1608 and the corresponding engine exhaust plume 1212. From operation 2114, the routine 2100 continues to operation 2116, where the side duct surface 1604 is closed to decrease the width of the exit aperture 1608 and the engine exhaust plume 1212. At operation 2118, the lower duct surface 1606 may be kicked up to detach the engine exhaust plume 1212 from the upper surface of the wing and/or USB flaps 1206 and the routine 2100 ends.

It should be clear from the description of the controllable USB nozzle aperture 1600 that when used in conjunction with the USB flaps 1206, a pilot is provided with any number of configurations that allow for precise control over the lift created, and consequently, the aircraft airspeed and throttle settings for any given flight operation. For example, during short field takeoff operations, the pilot or computing system 216 may choose to deploy the USB flaps 1206, but configure the controllable USB nozzle aperture 1600 in an open configuration, with the upper duct surface 1602 raised and the lower duct surface 1606 kicked up to prevent the engine exhaust plume 1212 from attaching to the deployed USB flaps 1206. In this configuration, the aircraft may accelerate quickly and at a proper takeoff speed, the pilot can drop the lower duct surface 1606 down, lower the upper duct surface 1602, and lower the side duct surface 1604 to rapidly spread and attach the engine exhaust plume 1212 to the USB flaps 1206 for a rapid increase in lift.

Figure 22:
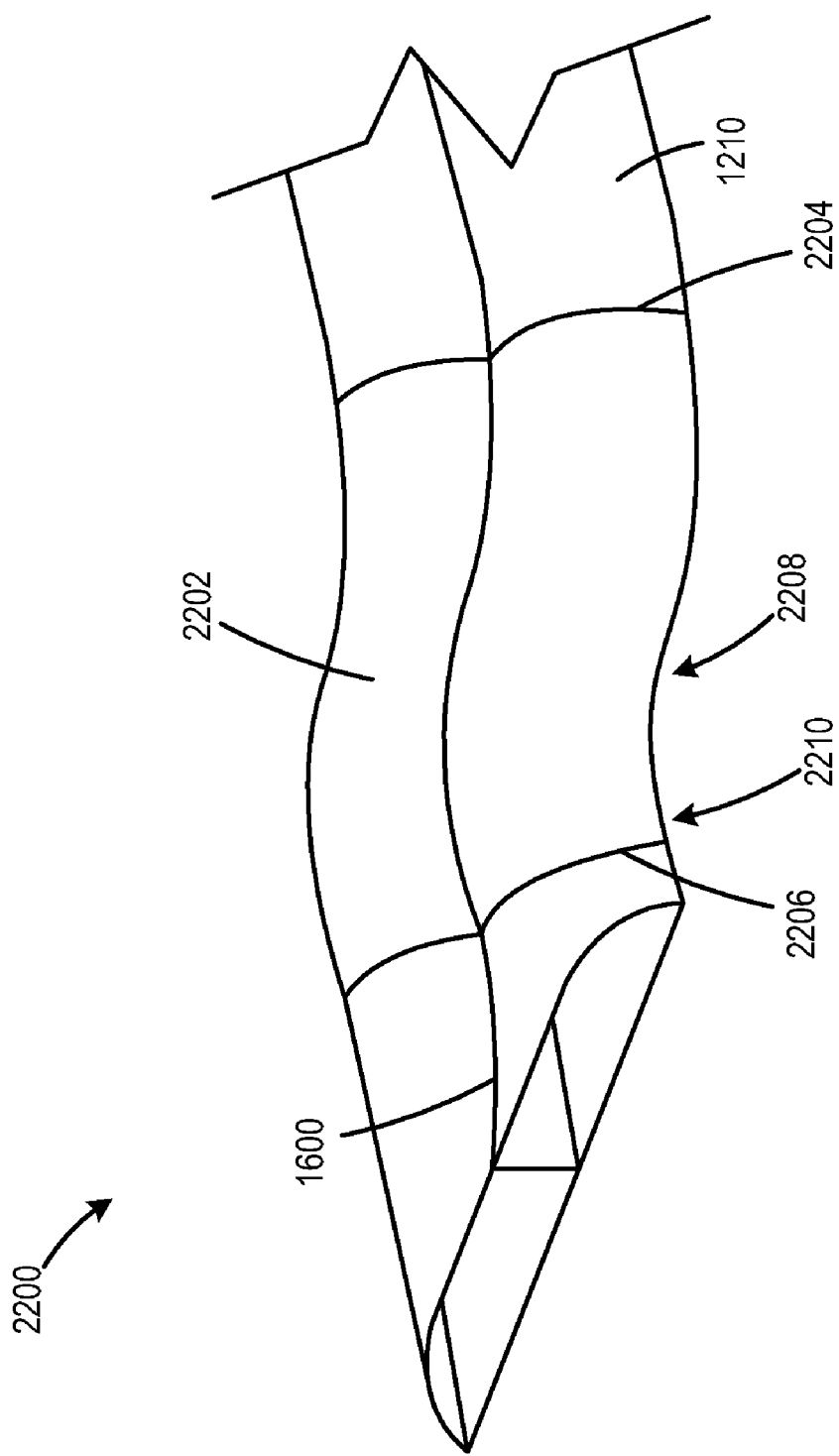
FIG. 22 is a perspective view of an aircraft engine nozzle system showing a universal convergent nozzle connected between an aircraft engine and a distinct nozzle aperture according to various embodiments presented herein.
Figure 23:
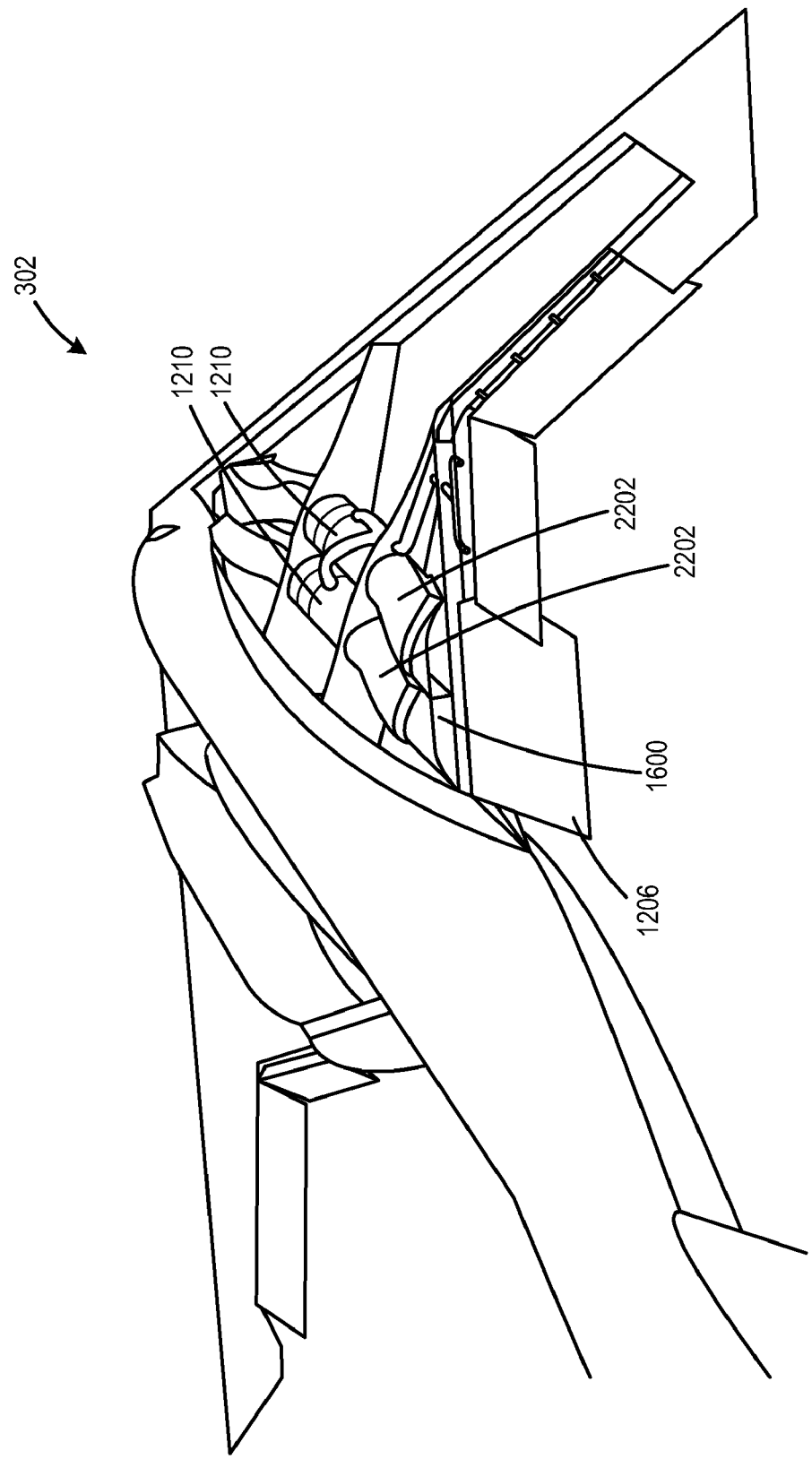
FIG. 23 is a perspective view of a portion of a cargo aircraft with a cut-away wing portion showing universal convergent nozzles connecting a pair of aircraft engines to controllable upper surface blown nozzle apertures according to various embodiments presented herein.

Turning now to FIGS. 22 and 23, an aircraft engine nozzle system 2200 according to various embodiments will be described. FIG. 22 shows the aircraft engine nozzle system 2200 that includes a pair of adjacent engines 1210 attached to a pair of universal convergent nozzles 2202, which are attached to distinct nozzle apertures that may be unique to the specific engine mounting location. According to various embodiments, the distinct nozzle apertures include controllable USB nozzle apertures 1600 such as the nozzle apertures described above. Typical aircraft that largely utilize integrated engine installations within the body of the aircraft require specific parts that are specifically designed for the particular engine mounting location. This is due to the unique geometry of the wing or fuselage at each engine mounting location that requires a distinct geometry of the corresponding engine inlet or nozzle. However, swapping engines 1210 between engine mounting locations can be burdensome if different engine components and/or engine operation software must be used for engines at different mounting positions.

Aspects of the disclosure provided herein utilize a universal convergent nozzle 2202 for every engine mounting location on the cargo aircraft 302. Each universal convergent nozzle 2202 can be used with any engine and ensures that engine performance is common at each engine mounting location, irrespective of the geometry and features of the potentially distinct controllable USB nozzle aperture 1600 that is mounted aft of the universal convergent nozzle 2202. FIG. 22 shows two universal convergent nozzles 2202 mounted between two corresponding engines 1210 and a controllable USB nozzle aperture 1600.

Each universal convergent nozzle 2202 has a first end 2204 that is mounted to the engine 1210 and a second end 2206 mounted to the controllable USB nozzle aperture 1600. Between the two ends, the universal convergent nozzle 2202 includes a convergent duct 2208 that converges the flow of the engine exhaust down to the throat 2210, which is located at or proximate to the second end 2206. The convergent duct 2208 may include an S-turn that redirects the flow. The universal convergent nozzle 2202 may include any thrust reversing components or any other components or features that are common for all engines and that may be included upstream of the throat 2210. The divergent portion of the engine nozzle is included in the controllable USB nozzle aperture 1600, which is downstream of the throat 2210 located in the universal convergent nozzle 2202.

By positioning the throat 2210 within the universal convergent nozzle 2202, it can be ensured that the exhaust flow is going in the same direction for all engine nozzles and that the flow has the same characteristics for all engine nozzles. For this reason, whatever happens to the flow downstream of the throat 2210 will not negatively affect the performance of the engine. For example, as seen in FIG. 23, one embodiment of the cargo aircraft 302 includes four engines 1210, mounted in pairs within each wing. Depending on the mounting location, the engine exhaust plume 1212 experiences a controllable USB nozzle aperture 1600 that may include different geometry and aperture treatments from other controllable USB nozzle apertures 1600 at other mounting locations, such as various configurations of saw teeth and plume control devices. These treatments will not affect the exhaust flow in a manner that creates backpressure that could damage or negatively affect the engine 1210 since the treatments are located downstream from the throat 2210 in a divergent portion of the nozzle. Each universal convergent nozzle 2202 ensures that the engine exhaust plume 1212 of each engine 1210 exits each universal convergent nozzle 2202 at a flow direction that is perpendicular to a plane containing the nozzle throat.

Figure 24:
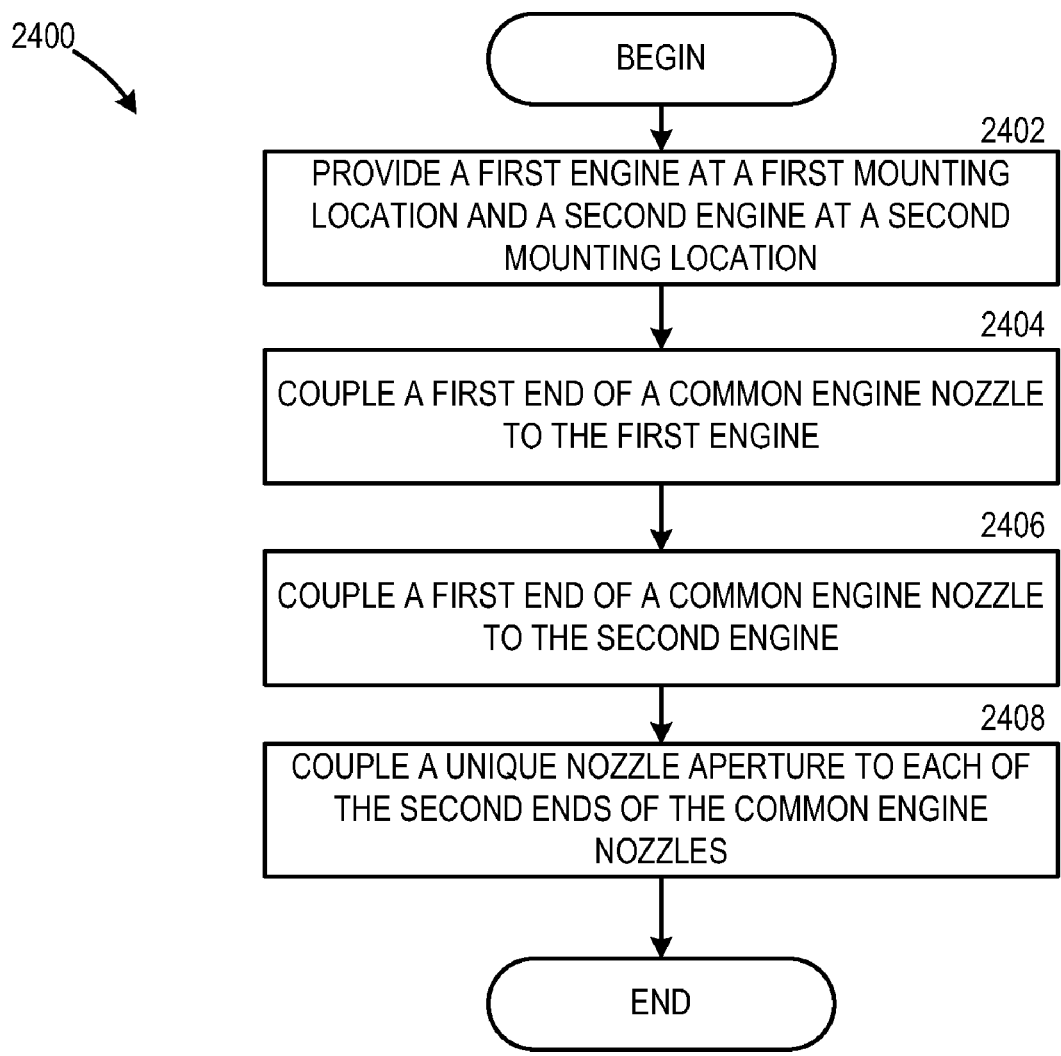
FIG. 24 is a flow diagram showing a method of assembling an aircraft engine nozzle system according to various embodiments presented herein.

FIG. 24 shows an illustrative routine 2400 for assembling an aircraft engine nozzle system. The routine 2400 begins at operation 2402, where a first engine 1210 is provided at a first mounting location and a second engine 1210 is provided at a second mounting location. At operation 2404, the first end 2204 of a universal convergent nozzle 2202 is coupled to the first engine 1210. Similarly, at operation 2406, the first end 2204 of another universal convergent nozzle 2202 is coupled to the second engine 1210. Because the universal convergent nozzles 2202 are configured to mount to any engine 1210 at any engine mounting location, it should be appreciated that coupling a universal convergent nozzle 2202 to an engine 1210 may include first uncoupling the universal convergent nozzle 2202 from another engine 1210 at another engine location, such as from an unserviceable aircraft, to be used at a new engine mounting location.

The routine 2400 continues from operation 2406 to operation 2408, where a distinct controllable USB nozzle aperture 1600 is coupled to each of the second ends 2206 of the universal convergent nozzles 2202 and the routine 2400 ends. It should be appreciated that the distinct controllable USB nozzle aperture 1600 may be a single controllable USB nozzle aperture 1600 having separate exit apertures 1608, or may include separate distinct nozzle apertures for each of the engines 1210.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A swept-wing powered-lift aircraft, comprising:
a wing comprising an inboard portion and an outboard portion,
wherein the inboard portion comprises a rearward-swept leading edge and a wing flap positioned within an exhaust flow of an aircraft engine, and
wherein the outboard portion comprises the rearward-swept leading edge and a rearward-swept trailing edge and is configured such that a center of lift of the swept-wing powered-lift aircraft is positioned approximately along a lateral axis that comprises a center of lift of the wing flap.

2. The swept-wing powered-lift aircraft of claim 1, wherein the inboard portion of the wing comprises a forward-swept flap trailing edge.

3. The swept-wing powered-lift aircraft of claim 2, wherein the forward-swept flap trailing edge sweeps forward approximately 20-50 degrees.

4. The swept-wing powered-lift aircraft of claim 1, wherein the rearward-swept trailing edge of the outboard portion sweeps rearward approximately 30-50 degrees.

5. The swept-wing powered-lift aircraft of claim 1, wherein the rearward-swept leading edge sweeps rearward approximately 30-50 degrees.

6. The swept-wing powered-lift aircraft of claim 5, wherein the swept-wing aircraft is operative to perform short takeoff and landing (STOL) operations.

7. The swept-wing powered-lift aircraft of claim 1, further comprising a tail section comprising a plurality of control surfaces sized and configured according to the center of lift of the swept-wing powered-lift aircraft being positioned along the lateral axis to provide stability, control, and trim for both cruise and STOL operations.

8. The swept-wing powered-lift aircraft of claim 1, wherein the wing further comprises a wing spar having a wing root thickness corresponding to a height of a payload space within a fuselage, the wing spar comprising:
an upper spar chord terminated at and connected to an upper portion of the fuselage, and
a lower spar chord terminated at and connected to a lower portion of the fuselage.

9. The swept-wing powered-lift aircraft of claim 8, wherein the wing spar further comprises at least one engine mounting aperture configured to provide for at least one engine to be internally mounted within the wing.

10. The swept-wing powered-lift aircraft of claim 1, wherein the wing flap comprises a conformal upper surface blown (USB) flap.

* * * * *